United States Patent
Friesth

(10) Patent No.: US 9,624,913 B2
(45) Date of Patent: Apr. 18, 2017

(54) HYBRID TRIGENERATION SYSTEM BASED MICROGRID COMBINED COOLING, HEAT AND POWER PROVIDING HEATING, COOLING, ELECTRICAL GENERATION AND ENERGY STORAGE USING AN INTEGRATED AUTOMATION SYSTEM FOR MONITOR, ANALYSIS AND CONTROL

(71) Applicant: Kevin Lee Friesth, Fort Dodge, IA (US)

(72) Inventor: Kevin Lee Friesth, Fort Dodge, IA (US)

(*) Notice: Subject to any disclaimer, the term of this patent is extended or adjusted under 35 U.S.C. 154(b) by 205 days.

(21) Appl. No.: 14/081,271

(22) Filed: Nov. 15, 2013

(65) Prior Publication Data
US 2014/0174080 A1    Jun. 26, 2014

Related U.S. Application Data

(60) Provisional application No. 61/727,108, filed on Nov. 15, 2012, provisional application No. 61/859,377, (Continued)

(51) Int. Cl.
*F03G 7/04* (2006.01)
*F01K 3/00* (2006.01)
(Continued)

(52) U.S. Cl.
CPC ............... *F03G 7/04* (2013.01); *F01K 3/00* (2013.01); *F01K 13/00* (2013.01); *F01K 13/02* (2013.01);
(Continued)

(58) Field of Classification Search
CPC ... F03G 7/04; F03G 6/00; F01K 13/00; F01K 25/00; F01K 3/00; F01K 13/02; F02G 1/043; Y02E 10/46; Y02B 10/20
(Continued)

(56) References Cited

U.S. PATENT DOCUMENTS 3,841,097 A * 10/1974 Siegel .............................. 60/517
4,094,148 A    6/1978 Nelson
(Continued)

FOREIGN PATENT DOCUMENTS

EP    0 084 815    8/1983
EP    2335813    6/2011
(Continued)

OTHER PUBLICATIONS

Invitation to Pay Additional Fees including Communication Relating to the Results of the Partial International Search of the International Searching Authority.
(Continued)

*Primary Examiner* — Hoang Nguyen
(74) *Attorney, Agent, or Firm* — Brick Gentry PC; Brian J. Laurenzo; Jessica L. Susie

(57) ABSTRACT

Provided is a consumer to industrial scale energy trigeneration process based microgrid combined cooling, heat and power. The present invention includes conversion, processing, extraction and/or storage systems for electrical, chemical and thermal energy. The invention provides a quintessential renewable energy ecosystem incorporating vital energy generation, thermal heating and cooling processes with integrated components installed to encompass a distributed renewable energy generation, energy storage and integrated automation system. The automation system of the invention provides the ability to view, monitor, analyze, control and interact with system components.

14 Claims, 10 Drawing Sheets

Related U.S. Application Data filed on Jul. 29, 2013, provisional application No. 61/877,467, filed on Sep. 13, 2013, provisional application No. 61/886,213, filed on Oct. 3, 2013, provisional application No. 61/896,039, filed on Oct. 26, 2013.

(51) Int. Cl.
*F03G 6/00* (2006.01)
*F02G 1/043* (2006.01)
*F01K 13/00* (2006.01)
*F01K 13/02* (2006.01)
*F01K 25/00* (2006.01)

(52) U.S. Cl.
CPC .............. *F01K 25/00* (2013.01); *F02G 1/043* (2013.01); *F03G 6/00* (2013.01); *Y02B 10/20* (2013.01); *Y02E 10/46* (2013.01); *Y02P 80/15* (2015.11); *Y02P 80/24* (2015.11)

(58) Field of Classification Search
USPC .................... 60/641.8–641.15, 676, 517–526
See application file for complete search history.

(56) References Cited

U.S. PATENT DOCUMENTS

| | | | |
|---|---|---|---|
| 4,455,826 A * | 6/1984 | Knoos | 60/526 |
| 4,455,841 A * | 6/1984 | Wurm et al. | 62/6 |
| 4,642,988 A * | 2/1987 | Benson | 60/641.14 |
| 4,903,503 A * | 2/1990 | Meckler | 62/238.3 |
| 7,877,999 B2 * | 2/2011 | Nuel et al. | 60/641.13 |
| 2009/0313994 A1 * | 12/2009 | Bennett | 60/641.8 |
| 2012/0100062 A1 * | 4/2012 | Nakamura et al. | 423/359 |

FOREIGN PATENT DOCUMENTS

| | | |
|---|---|---|
| GB | 1 530 126 | 10/1978 |
| WO | WO2010092584 | 8/2010 |
| WO | WO2011011831 | 2/2011 |
| WO | WO2011/077248 | 6/2011 |
| WO | WO2011077248 | 6/2011 |

OTHER PUBLICATIONS

Patent Cooperation Treaty International Search Report and Written Opinion of the International Searching Authority.
The extended European Search Report of the Patent Cooperation Treaty International Search Report and Written Opinion of the International Searching Authority issued May 27, 2015.

* cited by examiner

HYBRID TRIGENERATION SYSTEM BASED MICROGRID COMBINED COOLING, HEAT AND POWER PROVIDING HEATING, COOLING, ELECTRICAL GENERATION AND ENERGY STORAGE USING AN INTEGRATED AUTOMATION SYSTEM FOR MONITOR, ANALYSIS AND CONTROL

CROSS-REFERENCE TO RELATED APPLICATIONS

This application claims priority from U.S. Provisional Application Ser. No. 61/727,108 filed Nov. 15, 2012 and entitled HYBRID WIND SOLAR HYDROGEN AMMONIA REGENERATE SYSTEM; from U.S. Provisional Application Ser. No. 61/859,377 filed Jul. 29, 2013 and entitled DISTRIBUTED HYBRID ENERGY GENERATION, STORAGE SYSTEM AND INTEGRATED MONITOR, ANALYSIS AND CONTROL SYSTEM; from U.S. Provisional Application Ser. No. 61/877,467 filed Sep. 13, 2013 entitled DISTRIBUTED HYBRID ENERGY GENERATION, STORAGE SYSTEM AND INTEGRATED MONITOR, ANALYSIS AND CONTROL SYSTEM; from U.S. Provisional Application Ser. No. 61/886,213 filed Oct. 3, 2013 entitled HYBRID SOLAR TRIGENERATION SYSTEM BASED MICROGRID CCHP PROVIDING HEATING, COOLING, ELECTRICAL GENERATION AND ENERGY STORAGE USING AN INTEGRATED AUTOMATION SYSTEM FOR MONITOR, ANALYSIS AND CONTROL; and from U.S. Provisional Application Ser. No. 61/896,039 filed Oct. 26, 2013 entitled HYBRID TRIGENERATION SYSTEM BASED MICROGRID CCHP PROVIDING HEATING, COOLING, ELECTRICAL GENERATION AND ENERGY STORAGE USING AN INTEGRATED AUTOMATION SYSTEM FOR MONITOR, ANALYSIS AND CONTROL. The contents of U.S. Provisional Application Ser. No. 61/727,108, U.S. Provisional Application Ser. No. 61/859,377, U.S. Provisional Application Ser. No. 61/877,467, U.S. Provisional Application Ser. No. 61/886,213 and U.S. Provisional Application Ser. No. 61/896,039 are hereby incorporated in their entireties by reference.

FIELD OF THE INVENTION

The present invention relates to processes of capturing and converting energy and monitoring said processes. More specifically, the invention relates to elements encompassing distributed energy generation, including hybrid wind and solar energy generation, energy transfer, energy conversion, energy storage, energy provisioning, intelligent software and hardware interface offering energy monitoring, analysis and building automation interfacing/control.

BACKGROUND

Wind turbines, solar generators, thermal solar, photovoltaic (sometimes "PV") solar, chemical, electrolyzers, Haber/Bosch processes and thermal energy storage are known in prior art. Additionally, Stirling applications and processes, chiller, refrigeration, heating, cooling, air conditioning, water heating, distillation, water purification and desalination systems, pressure swing absorption as well as electrical regeneration using various types of fuel, chemical and thermal sources in various designs and configurations for providing energy generation to fulfill energy needs are known in prior art. However, the prior art systems and devices, including those above, have drawbacks, particularly when said systems are physically deployed, are generally not planned, or established and/or orchestrated to benefit from higher efficiency as sub-systems in an integrated system environment. Generally prior systems are planned for deployment with an efficiency basis as an independent device with subpar system design performance. Deployment of prior art requires higher part count, increased manufacturing costs, increased assembly costs, increased transportation costs, increased subpart count and more costly parts with larger custom parts inventory required. In addition, prior systems require overlapping and duplicated subsystems, frequent problematic maintenance and repair costs, rising levelized cost of energy and products production. These in turn cause higher operating expenses, grid energy connection issues and transfer line losses.

Prior art smartgrid designs primarily use smart meters on consumer connections to monitor usage. Improving upon prior art smartgrid implementations, the current invention is effectuated via monitoring usage, identifying the energy usage sources through device data transmissions, manual consumer input and from its common electrical signal fingerprint. The current invention further stores profile data sets, responds with appropriate energy assumptions from extracted usage profiles, analyzes time of day usage for enhanced energy load response and analyzes power quality and energy availability to enhance overall grid stability. The electronic monitoring, identification, energy generation, baseload energy load response and energy provisioning to satisfy grid stability from supply compensation for end use requirements and control element of the present invention in the current application shall henceforth be known and designated from the above as elements for the features and functionality as system to be known as "ULTRA GRID™".

Cogeneration, or combined heat and power ("CHP"), is the use of a heat engine or localized power station to simultaneously generate electricity and useful heat. Trigeneration, or combined cooling, heat and power ("CCHP"), refers to the simultaneous generation of electricity and useful heating and cooling from the available processes and applications. A generation system producing electricity, heating and cooling is called a regeneration or polygeneration plant.

Cogeneration is a thermodynamically efficient use of fuel. In separate production of electricity, some energy must be discarded as waste heat, but in cogeneration this thermal energy is put to use. All thermal power plants emit heat during electricity generation, which can be released into the natural environment through cooling towers, flue gas or by other means.

In contrast, CHP captures some or all of the by-product heat for heating, either very close to the plant or as hot water or as water and glycol mixture for associated neighborhood radiated and/or district heating with temperatures ranging from approximately 80 to 180° C. (176-356° F.). This is also known as combined heat and power district heating "CHPDH"). Small CHP plants are an example of decentralized distributed energy. Readily available waste thermal energy at moderate temperatures (100-180° C., 212-356° F.) can also be used in absorption cooling processes with chillers and refrigerators for active cooling usage, radiated cooling applications and cold energy storage.

The supply of high-temperature thermal energy primarily would drive thermal intensive applications such as providing thermal energy input for a Stirling cycle engine or steam-powered generator and the resulting lower temperature thermal waste energy is then used for distillation, water or radiated space heating as described in cogeneration. Trigeneration differs from cogeneration in that the thermal waste energy is used for both heating and cooling, typically with an absorption chiller or refrigerator. CCHP systems can attain even higher overall efficiencies than cogeneration or traditional power plants. In the United States, the application of trigeneration in buildings is called building cooling, heating and power ("BCHP"). Heating and cooling output, whether direct or through passive radiated heating and cooling, may operate concurrently or alternately depending on need and system construction as well as quantity and quality of available waste energy.

Cogeneration was practiced in some of the earliest installations of electrical generation. Before central stations offered distributed power, industries generated their own energy using exhaust steam for process heating. Large office and apartment buildings, hotels and stores commonly generated their own power and used waste steam for building heat. Due to the high cost of early purchased power, these distributed CHP operations continued for many years even after utility electricity became available.

Micro CCHP, "Micro trigeneration" is often considered an ideal implementation of a distributed energy resource ("DER"). The installation is generally less than 5 kWe in house, small business and/or light commercial application. Instead of burning fuel or using an energy capture system to merely heat and cool space or water, some of the energy is converted to electricity in addition to direct heating, cooling or passive radiated heat and cooling. This electricity can be used within the home or business or, if permitted, by the grid management, sold back into the electric power grid. This development of small scale CCHP systems has provided the opportunity for in-house energy generation defaulting to using grid energy as the backup source as a last resort only if storage reserves are depleted.

A microgrid is a localized grouping of electricity generation, energy storage and loads that normally operate connected to a traditional centralized grid (macrogrid). This single point of common coupling with the macrogrid can be disconnected. The microgrid can then function autonomously. Generation and loads in a microgrid are usually interconnected at low voltage. From the point of view of the grid operator, a connected microgrid can be controlled as if it were one entity. Microgrid generation resources can include fuel cells, wind, solar or other energy sources. The multiple dispersed generation sources and ability to isolate the microgrid from a larger network would provide highly reliable electric power. Produced heat from generation sources such as Stirling cycle engines could be used for local direct process heating and cooling or passive radiated space heating and cooling, allowing flexible interchange between the needs and available methods to provide heating, cooling and electric power.

A Stirling cycle thermal engine is manufactured from metal and/or similar characteristic materials. The Stirling cycle thermal engine has a compression side also known as a compression side cylinder with a power piston for compression which uses liquid cooling ports around the vessel and a displacer side also known as a hot side vessel which has a connected heat source and contains a regenerator area and a displacer with a piston. Thermal differential is the basis for Stirling cycle energy generation. Prior art systems and processes use air cooling or a common heat distribution system type of water cooling with ambient air with a fan to radiate heat away from the compression side of the system.

The Stirling cycle thermal engine is an alternate engine design to the internal combustion engine, steam turbine and gas turbine. Multiple designs for Stirling heat engines have been developed and are well-documented in prior art. Despite the Stirling cycle thermal engine Carnot potential for greater thermodynamic efficiency compared to internal combustion engines, Stirling cycle thermal engines have only been used very infrequently and in highly limited applications in the past. This is due to several factors that occurred often during the primary research years, such as the lack of specialized manufacturing capacity, lack of special metals and alloys, complexity of the designs, cheap disposable energy input, type of available energy of internal combustion versus Stirling cycle thermal engine when used for transportation, the hulk weight of the engine per energy unit of torque rotational energy output and the past difficulty with starting a thermal engine as well.

The ideal Stirling cycle includes the following three thermodynamic processes acting on the working fluid; 1) Isothermal Expansion—the expansion-space and associated heat exchanger are maintained at a constant high thermal temperature and the gas undergoes near-isothermal expansion absorbing heat front the hot source; 2) Constant-Volume (known as isovolumetric or isochoric) heat-removal—the gas is passed through the regenerator, where it cools, transferring thermal energy to the regenerator for use in the next cycle; and 3) Isothermal Compression—the compression space and associated heat exchanger are maintained at a constant low thermal temperature so the gas undergoes near-isothermal compression rejecting heat to the cold sink. The theoretical thermal efficiency equals that of the hypothetical Carnot cycle—i.e. the highest efficiency attainable by any heat engine.

Alpha, Beta and Gamma Stirling engines are well known in the art. A Gamma Stirling engine is simply a Beta Stirling engine in which the power piston is mounted in a separate cylinder alongside the displacer piston cylinder. However, it is still connected to the same flywheel and crankshaft. The gas in the two cylinders can flow freely between same and remains a single body. This configuration generally produces a low compression ratio but is mechanically simpler and often used in multi-cylinder Stirling engines.

Gamma type engines have a displacer and power piston, similar to Beta machines, however in different cylinders. This allows a convenient complete separation between the heat exchangers associated with the displacer cylinder and the compression and expansion work space associated with the piston. Thus they tend to have somewhat larger dead volume area than either the Alpha or Beta engines. In a multi-cylinder Stirling cycle engine, the cylinders are disposed in rows, the cylinders in one row being staggered with respect to the cylinders in the other row and the longitudinal axis of the cylinders in the first row being disposed at an angle to the longitudinal axis of the cylinders in the other row.

Wind energy technology is typically used to convert kinetic energy from wind into mechanical energy and/or electricity. To extract wind power, a wind turbine may include a rotor with a set of blades and a rotor shaft connected to the blades. Wind passing over the rotor connected blades may cause the blades to turn and the rotor shaft to rotate. In addition, the rotating rotor shaft may be coupled to a mechanical system that performs a mechanical task such as pumping water, atmosphere gas separation compressors, etc. Alternatively, the rotor shaft may be connected to an electric generator that converts the rotational energy into electricity; which may subsequently be used to power a consumer, commercial, industrial device and/or electrical grid.

Solar energy technology is typically used to convert radiated light energy from the sun into thermal energy and/or photovoltaic electricity. To extract solar power, a collection surface and/or reflector (as is the case with thermal solar technologies to concentrate the solar energies on the aforementioned solar collector surface) is used such that solar energy striking the collection surface is converted into photovoltaic generated electrical, energy or as thermal generated heat for direct use, transfer and/or storage. However, the variable nature of wind and availability of solar energy may interfere with baseload and/or on-demand generation of electricity, generated products and byproducts from wind and solar energy. For example energy storage using chemical and thermal techniques may be required to offset fluctuations in electricity, products and byproducts generated from wind and solar power and/or maintain reliable electric/thermal energy provisioning service and/or in a private and public electrical grid.

Electrolyzer technology is typically used to convert electrical energy using electrodes placed in water based conductive mixture to separate the hydrogen and oxygen. The process uses an electrolyte additive to enhance conductivity. To separate water into separate parts, a pair of electrodes, an anode and cathode are given a corresponding positive and negative voltage to disassociate the hydrogen and oxygen, the separated gases are then moved to storage or onward for further processing of additional products. Haber-Bosch is the technology for production of ammonia. Previously stored hydrogen is catalytically reacted with nitrogen (derived from process air—pressure swing absorption) with adequate pressure and thermal input in a pressure vessel to form synthesized anhydrous liquid ammonia. This step is known as the ammonia synthesis loop (also referred to as the Haber-Bosch process): $3H_2+N_2=2NH_3$. Prior art Haber/Bosch ammonia synthesis plants used the heat generated for use in synthesis of the hydrogen and nitrogen gases, which are combined then cooled using cooling towers, to cool the ammonia creating massive amounts of usable heat energy. Prior an used additional energy to remove the heat to cool the ammonia for storage further propagating efficiency losses and elevating product costs.

Pressure Swing Absorption (sometimes "PSA") is a technology used to separate a specific gas from a mixture of gases under pressure according to molecular characteristics using gas product specific filters and sieves. Atmosphere gas collection, pressurization separation is typically used to extract particular gases of interest such as Nitrogen, Oxygen and provide the gas feedstock supply for inert gas separation in future steps. Atmospheric inert feedstock gases for gas separation typically uses thermal distillation processes to extract individual gases of interest such as Argon, Helium, Xenon and other commonly known atmospheric gases. Gasses with particular gas specific, gas extraction sections are of interest for various applications and can be transported and processed to gas states and reprocessed into a liquid state for an appropriate type of storage system.

The current prior art also known as direct solar thermal energy generation technologies have the following disadvantages:

1. Large space requirement or limited reflector surface-to-ground surface ratio. This is typical for systems that are designed to minimize the overlapping-shadowing effect (blocking off either the incident or reflected sunlight) of adjacent reflectors. The distance between the reflector panel rows and their orientation may be optimized for a specific position of the sun on the sky that occurs only once (twice for equinox) a year. In order to make the highest use of the reflector panel surfaces, the rows are spaced with considerable gaps between them. This way the extent of the field required for a given thermal output becomes large. Large field then results in extensive and costly piping and other service infrastructures.
2. Limited, reflected energy per unit of linear length of the mirror. This is typical for systems that are designed to minimize the area of reflector field. In this case the reflector rows are often spaced evenly, close to each other. These systems have low reflector area utilization because the above described blocking-shadowing effect.
3. Limited seasonal energy. This is typical for all known systems, including the floating, rotating "Solar-Island" concept. This disadvantage comes from the fixed position of the reflectors in relation to the collectors. This anchored position of the mirrors, even if it is optimized, is ideal, only for a single hour of the year. However, for the rest of the year, the mirrors would require a different optimized distribution between the collectors.
4. Reduced collector and/or absorber efficiency. The known collector systems either have high heat losses or poor radiation, capturing efficiency. Heat losses are caused by the high surface temperature and high incident radiation flux. The root cause of inefficient collection and/or absorber efficiency is the inaccuracy of focusing mirrors over relatively large distances to the absorber. For instance the active absorber surface of the collector and/or absorber must be limited (to an optimal value). Additionally, the reflector panel distance to the closest collector receiving the reflected radiation needs to stay small to be able to capture the optimal energy of available sunlight.
5. Limited hydraulic stability, poor turndown ratio and insufficient controllability of the working fluid loop systems. As a consequence of horizontal absorber-tubing, extending over large areas and distances, prior art systems have very large pressure losses, ineffective control over the stability of heat transfer and the quality of steam. They have limited or no freeze protection, and are prone to high velocity fluid-hammer.
6. High cost and complexity of construction. While the LFR technologies in general and the Compact LFR in particular, is the simplest and most cost effective compared to other technologies, its installation cost is still considerable and leaves room for significant improvements.

Thermal energy storage ("TES") can be provisioned via thermal energy transfer fluids in high temperatures and/or medium temperatures generated from solar thermal, electrical and/or chemical reaction collector systems and/or from conversion in cooling systems such as single and multiple effect cooling, chillers and refrigeration systems for transference into cold temperature thermal energy storage. Additionally thermal energy can be generated via transference from a heating and/or cooling element or other derived application processes to initiate thermal conveyance to a medium, additionally as a method for electrical energy to thermal energy storage technique. Thermal energy on demand is made available from TES systems pumping thermal transfer fluids for direct use as a thermal energy production of a service, i.e. providing thermal energy for a space heating, water heater or other thermal intensive application(s). This process can be conducted via (1) fluid to thermal transfer device such as a Stirling engine and/or steam turbine; (2) thermal intensive applications usage;

and/or (3) through a secondary thermal transfer liquid for storage and reuse of waste thermal energy.

Grid Backup Energy Reserve, also called grid-scale energy storage, refers to the methods used to store energy on a consumer grid scale within a consumer's energy power grid. Energy is stored during times when production from energy generation components exceeds localized energy consumption and the stores are used at times when consumption exceeds available baseload production or establishes a higher baseline energy requirement. In this way, energy production need not be drastically scaled up and down to meet momentary consumption requirements; production levels are maintained at a more consistently stable level with improved energy quality. This has the advantage that energy storage based power plants and/or thermal energy can be efficiently and easily operated at constant production levels.

In particular, the use of grid-connected intermittent energy sources such as photovoltaic solar and thermal solar as well as wind turbines can benefit from grid energy thermal storage. Energy derived from solar and wind sources are inherently variable by nature, meaning the amount of electrical energy produced varies with time, day of the week, season and random environmental factors that occur in the variability of the weather. In electrical power grid and/or thermal intensive systems with energy storage, energy sources that rely on energy generated from wind and solar must have matched grid scale energy storage regeneration to be scaled up and down to match the rise and fall of energy production from intermittent energy sources. Thus, grid energy storage is a method that the consumer can use to adapt localized energy production to respond with on demand localized energy consumption, both of which can vary overtime. This is done to increase efficiency and lower the cost of energy production and/or to integrate and facilitate the use of intermittent energy sources.

Thermal energy storage most commonly uses a molten salt mixture as a high temperature transfer and storage medium which is used to store heat collected by a solar collection system or by electrical generated thermal storage injection. Stored energy can be used to generate electricity or provide thermal energy to applications and processes during inadequate energy generation availability or during extreme weather events. Thermal efficiencies over one year of 99% have been predicted. TES systems have shown that the electricity-in for storage to electricity-out (round trip) efficiency is in the range of 75 to 93% using enhanced energy recovery systems.

Therefore, the creation of a mechanism for mitigating variability and/or intermittency associated with the stable quality power production of energy consisting primarily of energy from wind, photovoltaic solar, thermal solar and other renewable energy sources is needed. Additionally, there is an absence of adequate solar energy generation from thermal solar collection with the purpose of thermal energy availability.

SUMMARY

The present embodiments relate to techniques for localized distributed energy generation and energy storage. Furthermore, the present embodiments relate to thermal solar systems for thermal energy generation and using the stored thermal and/or chemical and electrical energy to subsequently generate electricity and thermal energy on demand for heat and cooling types of thermal energy intensive applications. Additionally, the present embodiments allow for the integration of other energy generation apparatuses and storage systems essentially consisting of generating electrical, chemical and thermal energy.

The present embodiments relate to energy generation, processing and energy storage with a complimentary shared computerized data system using a common data interface into element subsystems and interconnecting a backbone network with an interactive artificial intelligence control and management system. This system provides intelligent energy provisioning based on past usage and intelligent projected energy generational needs. This includes interaction to high level functions such as surveillance systems, security systems and compatibility/connectivity to other manufacturers' home and device control including hardware and/or software. The invention is contemplated for use as a fully integrated distributed renewable energy ecosystem for a flexible interconnected energy system solution providing energy generation for electrical power generation, thermal energy for thermal storage and thermal intensive consumer usage.

Embodiments of the invention will introduce and extend artificial intelligence-interfaced component layers. Said layers include, but are not limited to, building and device automation systems, utilizing hardware- and software-based power monitoring, analysts and control systems for enhanced power quality analysis, energy cost tracking, energy demand control, automated billing and reporting. The principle aim is far long-term efficiencies and cost savings versus short-term less efficient alternatives. The preferred embodiment encompasses intelligent interfaces interconnecting monitor, analysis and control elements to improve reliability, manage energy flows, enable consumer-increased yields, reduce cost and reduce loss of service.

Solar PV, thermal and CCHP hybrid system are the foundation of this current invention's integrations and have great potential to radically reduce energy waste compared to previous electrical and heating systems. Additionally, the present invention enables the share of Solar PV and thermal hybrid installations to be greatly expanded. To reduce waste from excess heat, an absorption chiller is proposed to utilize the CCHP-produced thermal energy for cooling from the Solar PV, thermal-CCHP system, generation and storage. The trigeneration solar, PV and thermal systems have the potential to save even more energy and further reduce emissions compared to conventional sources of direct on demand power, heating and cooling. The invention's hybrid aspect is the multiple inputs, outputs and the included storage of high temperature, medium temperature, low temperature and cold temperature thermal storage.

One embodiment of the present invention uses a Stirling cycle thermal engine. The Stirling engine of the embodiment involves using external high temperature input and a novel cold temperature external low temperature input, creating a much greater degree of temperature differential. The greater temperature differential allows more energy output to foe realized without raising the high temperature input and its implied issues of transfer losses, metal fatigue and corrosion as well as the lower system lifespan expectancy the prior art exhibits.

For example, a high temperature input of 426.67° C. (approximately 800° F.) and a cool temperature of a standard installation, ambient air sample temperature of 37.78° C. (approximately 100° F.) in summer would create a 388.89° C. (approximately 700° F.) differential. Whereas, with the improved aspect of the current invention, using the same estimated high temperature input of 426.67° C. (approximately 800° F.) but the low temperature input from cold storage of −28.89° C. (approximately −20° F.), creates a 455.56° C. (approximately 820° F.) differential; thus, providing far greater power output, efficiency and longer life with the entire system running cooler without the negative consequences of raising the high temperature input to gain the same temperature differential.

The present invention utilizes a Stirling engine consisting of a plurality of like positioning members to stabilize the inner and outer vessels. This is also contemplated to allow positioning the alignments in the form of a linear, inline "V", double "V", "W" and/or radial cylinder engine layout. By providing like positioning members that extend between the displacer and compression cylinders, a fastened construction is obtained which allows the inner and outer vessels to reinforce each other, thus permitting the use of thin walled vessels and improving the thermal efficiency while decreasing the weight and material requirements of the Stirling cycle thermal engine.

Because thermal solar is often sufficient for thermal input to storage for on-demand use. Stirling engine usage of stored thermal energy is primarily for rotational energy for electrical generation and/or other rotational energy intensive applications. Inclusion of wind or photovoltaic solar energies would be for the primary job of creating electrical energy for localized consumption, with excess generation transferred to thermal storage or potential public grid provisioning. Excess and peak electrical generation can be stored as thermal energy at near 93% efficiency.

One embodiment of the present invention contemplates a primary energy generation source of solar energy, which has both a thermal solar and a photovoltaic (PV) component. Due to the cost and efficiency of PV per watt, PV's primary inclusion is for charging batteries for energy provisioning of the sensors, sun tracking positioner motors 148 and power for thermal capture flow control valve systems. The other function of the PV electrical power would be to operate localized PLC or computer for control, analysis and monitoring systems.

The thermal solar system has two separate temperature loops, a high temperature loop consisting of high temperature molten salt fluid at approximately 565.56° C. (1050° F.) and a secondary loop consisting of a medium temperature water/glycol mixture fluid at approximately 110° C. (230° F.). The contemplated ratio for the medium temperature fluid is 40% water to 60% glycol mixture. The high temperature and medium temperature fluids of the present invention are transferred to their associated temperature storage vessels for on-demand use.

The high temperature storage vessels include, but are not limited to, the following common purposes: 1) provide thermal input to ammonia ($NH_3$) processes ($NH_3$ synthesis or $NH_3$ cracking for hydrogen ($H_2$) and nitrogen ($N_2$) separation); 2) provide thermal input to Stirling engines for rotational work; 3) provide rotational work for generating electrical output; 4) provide rotational work for operating a pressure swing absorption module (for pressure swing absorption air gas separation); 5) provide rotational work for operating pumps for reverse osmosis water purification and elevated water storage; 6) provide rotational work for operating Stirling coolers for gas liquefaction; 7) provide thermal input to steam generation for a steam turbine for rotational work; 8) provide rotational work for generating electrical output, and 9) provide thermal input for other various high temperature applications.

The medium temperature storage vessels include, but are not limited to, the following common purposes: 1) provide required thermal input to absorption cooling; 2) provide hot water heating function 3) provide thermal input for space heating; 4) provide preheat for the high temperature thermal loop during initial startups; 5) provide required thermal input to distillation of gases and/or water purification; 6) provide a medium temperature consolidated storage vessel for waste heat from the Stirling engines, steam turbines and various thermal processes; and 7) provide thermal input for other various medium temperature applications.

The low temperature storage vessels include, but are not limited to, the following common purposes: 1) provide required thermal input to geothermal and/or passive heating applications; 2) provide sidewalk and parking heating function; 3) provide thermal input for space heating; 4) provide preheat for the medium temperature thermal loops during initial startups; 5) providing required thermal input to distillation of gases and/or water purification subsystems; 6) provide a low temperature consolidated storage vessel for waste heat from a Stirling engines, steam turbines and/or various other thermal processes; and 7) provide thermal input for other various low temperature applications.

The cold temperature storage vessels include, but are not limited to, the following common purposes: 1) provide thermal input for use with the cooling aspect of a Stirling thermal cycle engine; 2) provide thermal input for use with the cooling aspect of a Stirling cryo-cooler system; 3) provide thermal input for use in air conditioning in active or passive cooling systems; 4) provide thermal input for use in distillation processes for separation of gases; and 5) provide thermal input for other various low temperature and cooling applications.

An improved approach to the grid energy storage discussed above is the inclusion of ULTRA-GRID™ of the present invention. As discussed above, ULTRAGRID™ is the electronic monitoring, identification, energy generation, baseload energy response, energy provisioning and control element of the present invention. The current, prior art power grid is designed and developed unable to allow generation sources to respond to on-demand consumer needs, while an ULTRAGRID™ based smart grid can be designed so that usage varies on-demand with production availability from intermittent power sources such as wind and solar energy. In addition, the ULTRAGRID™ is stabilized by matched, stored energy release for consumer grid generation for both electrical and/or thermal intensive systems. End-user loads can be proactively projected and timed for a concerted startup during peak usage periods. Furthermore, the cost of energy can dynamically vary between peak and non-peak periods to encourage turning off non-essential high energy loads or control application startup to not occur simultaneously.

Another improvement is using consumer grid scale electrical energy surplus via electrical derived thermal generation for consumer grid scale thermal storage. This enables storage in the hundreds and potentially thousands of kilowatt hours, expandable to tens of megawatt hours, or potentially much greater term energy storage, of energy available on demand.

The present invention has the ability to store excess wind and/or photovoltaic solar electrical energy as consumer grid scale thermal energy storage. The excess electrical energy which is stored as thermal energy can be used as an active or as an on-demand energy source for energy generation for consumer grid baseload or can be used to meet high peak demand load needs for load stability and voltage stability and localized power quality consumer grid efficiency. Additionally, the present invention is the complete integration of localized onsite thermal and geothermal energy storage that can be used as an on-demand energy source for energy generation, for thermal storage maintenance heat generation, grid baseload, intermediate baseload peaking support or can be used to meet high peak demand load needs for load stability, frequency matching, voltage stability and grid efficiency.

The present invention reduces or completely eliminates the need for overlapping and redundant subsystems, reducing part counts and excess energy usage from elimination of duplicated systems and subsystems. The prior art depended primarily on efforts in engineering device efficiency and decreasing manufacturing costs. These methods are helpful but are limited in their scope and effectiveness due to the incremental enhancement typical to this type of development. The prior art relied heavily on modest evolutionary adaptations versus much more in depth fundamental revolutionary changes.

The present invention differs from other prior art from inclusion and incorporation of thermal solar, wind, photovoltaic solar with integration to thermal storage and geothermal storage components. The present invention differs from other prior art systems from the above integration through electrical generation, heat for thermal applications energy, cold for cold thermal required applications while removing redundant components and their processes thereby reducing energy input requirements. Prior art uses additional energy input to remove the heat to cool the areas with direct or passive methods within a consumer's enclosed area thereby reducing energy usage efficiency wherein the present invention harnesses the heat energy for beneficial work. The present invention uses the waste heat generated from the electrical generation process for use as the input energy as heat source for single and multiple effect cooling, chillers and refrigeration, vapor and compressor cooling processes, water purification, desalination and water heating application processes creating additional benefit of using available expended energy; compared to prior art creating energy loss and inefficiency by its deficient design.

The present invention differs front other prior art particularly alkaline hydrogen electrolyzer and similar devices that typically uses a water and potassium hydroxide KOH mixture in a container and apply a DC current with two electrodes located in the mixture to separate hydrogen and oxygen; The present invention differs from other prior art haber/bosch ammonia synthesis plants and similar devices; The present invention differs from other prior art generation and regeneration systems and similar devices with its ability to reduce resistance thereby enhancing efficiency.

The present invention with its elemental approach for features and functionality as a complete system will be known as Modular Advanced Intelligent Commercial Energy System ("MAICES"). MAICES forms a foundation and basis for distributed electrical, chemical and thermal energy, localized storage reserves preserving electrical, chemical thermal energy and supply security.

Objectives of the present invention include, but are not limited to:

One object of the present invention is to greatly enhance the localized consumer grid by augmenting available consumer grid energy by utilizing localized generation and localized energy storage for on demand availability thereby lowering expensive commercial grid energy metered use.

A second object of the present invention is to provide a device that uses the available localized energy generation and storage to the benefit of reduced primetime grid demand usage and more efficient non-prime time energy generation and energy draw.

A third object of the present invention is to provide a device wherein multiple components are associated and interconnected with applications to one another to enhance efficiency and power production capabilities. This is effectuated by combining constituent processes to reduce thermal line loss and grid line loss; including energy component inefficiency losses by combining device element cycles and applications of thermal and electrical energy electrical demands.

A fourth object of the present invention is to reduce system component non-beneficial and redundant manufacturing and construction material requirements.

A fifth object of the present invention is to reduce system components count and area use requirements and greatly increases the ratio of energy generated in consideration of system component install costs, due to the improvement of hybrid integration and generation.

A sixth object of the present invention is to enable high efficiency by enabling thermal storage for hot and cold thermal energies providing for on demand availability versus prior art usage of inefficient increased startup and shutdown energy requirements of generation on demand for individual component applications and processes.

A seventh object of the present invention is the inclusion of energy generation, storage, component and area cooling and/or heating requirements into a single direct and passive system solution; including the ability to recycle thermal energy from other processes waste heat to enhance efficiency and reduce system energy input requirements.

An eighth object of the present invention is to recycle generated waste heat energy to use stored water supplies in closed loop coolant system in direct and passive methods to reduce subsystem requirements and maintenance.

A ninth object of the present invention is to recycle generated waste heat for ground water and waste water reclamation and purification while reducing input energy requirements.

A tenth object of the present invention is to recycle generated waste heat for potential use in desalination while reducing input energy requirements.

An eleventh object of the present invention is to recycle regenerated waste heat for use in distillation while reducing input energy requirements.

A twelfth object of the present invention is to recycle regenerated waste heat for heating water for usage and storage for on demand availability while reducing input energy requirements.

A thirteenth object of the present invention is to provide potable water from localized unprocessed water sources or contaminated public water provisioning.

A fourteenth object of the present invention is to store thermal energy to enable scalable consumer mass energy storage A fifteenth object of the present invention is to use stored thermal energy for conversion into localized caseload electrical energy.

A sixteenth object of the present invention is to use stored thermal energy for conversion into localized thermal application use for on demand and availability and usage.

A seventeenth object of the present invention is to use stored chemical energy for conversion to electrical and thermal energy.

An eighteenth object of the present invention is to reduce the carbon footprint for electrical and thermal generation.

A nineteenth object of the present invention is to reduce the carbon footprint for localized energy consumption.

A twentieth object of the present invention is to enable a localized renewable energy ecosystem for generation, storage and regeneration.

In addition, other objectives will be apparent from the figures and description herein below.

BRIEF DESCRIPTION OF THE DRAWINGS

FIG. 6a also shows the carriage apparatus of the traveling reflector panels. It illustrates the operation of the "travel & rotate" operation of the tracking mechanism.

DETAILED DESCRIPTION

The following is a detailed description of an embodiment of a hybrid trigeneration system based microgrid with integrated control systems (sometimes "system"). The following description is presented to enable any person skilled in the art to make and use the process of the present invention and is provided in the context of a particular application and its requirements. Various modifications to the disclosed embodiments will be readily apparent to those skilled in the art and the general principles defined herein may be applied to other embodiments and applications without departing from the spirit and scope of the present invention. Thus, the present invention is not limited to the embodiments shown, but is to be accorded the widest scope consistent with the principles and features disclosed herein. The following included description makes references to the accompanying drawings, which are provided for illustration of the preferred embodiment. However, such embodiments do not represent the full scope of the invention. The subject matter which the inventor does regard as his invention is particularly pointed out and distinctly claimed in the claims of this application.

Figure 1:
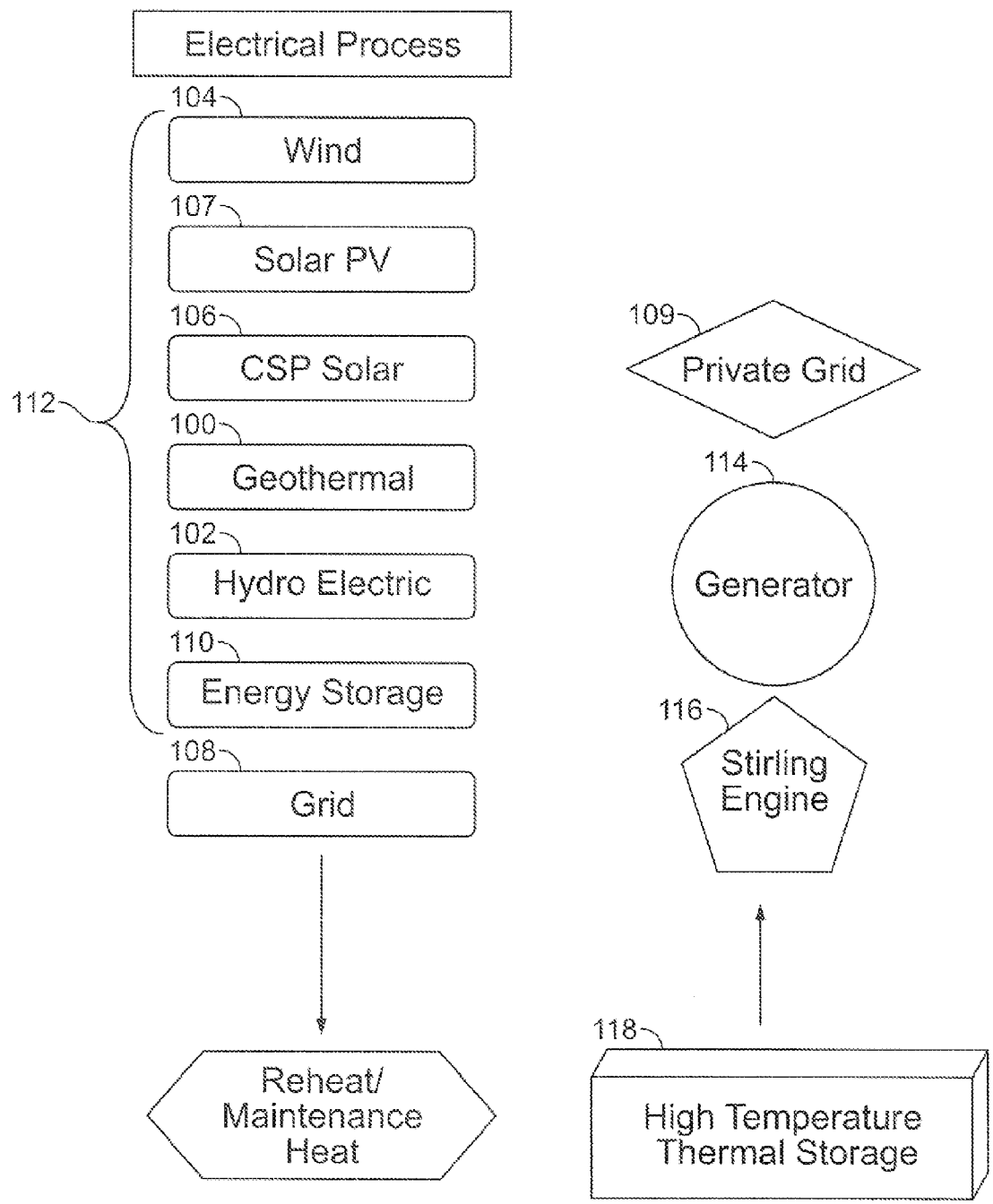
FIG. 1 is a flowchart according to one or more examples of an embodiment of an electrical process in accordance with the present invention.

Referring now to the drawings, FIG. 1 is a flowchart according to one or more examples of an embodiment of an electrical process in accordance with the present invention. The process utilizes one or more energy sources, including, but not limited to: wind 104, solar PV 107, thermal solar 106, geothermal 100, hydroelectric 102, energy storage 110 subsystems and/or public utility power grid(s) 108. The aforementioned list, excluding public utility power grid(s) 108, consists of the renewable energy sources 112 of the present invention. Said renewable energy sources 112 feed energy into a private grid 109 which in turn may be used to create usable work via a generator 114 and/or Stirling engine 116. The public utility power grid 108 is utilized in the system for reheating or maintenance heat of the high temperature thermal storage vessel 118 and as a backup energy source in instances where the private grid 109 falls short of end user power demands. The above-mentioned Stirling engine 116 utilizes one or more thermal energies from the renewable energy sources 112 as well as from the high temperature thermal storage vessel 118 to create usable work and/or electrical energy.

The present invention consists of a core renewable energy device for energy generation, processing, transfer and storage 110 with a common shared intelligent interactive energy generation system 178 and intelligent machine learning system. The disclosed embodiments provide a process for generating thermal energy in the form of thermal heat energy or for communication to a chiller and/or cooling process for cold based thermal storage 124. Solar 106, 107 power may be collected by a solar collection system, wind 104 power may be collected by a wind turbine, geothermal 100 power may be collected from a geothermal power plant, hydroelectric 102 power may be collected from a hydroelectric power generation source or grid 108 connected to collect power from available grid 108 energy sources.

To reduce costs and/or increase the reliability of renewable power 112, the system of FIG. 1 may store energy from the renewable energy generation and subsequently generate energy in the form of electrical, thermal, hydrogen, inert gas extraction and ammonia from the stored energy based on electric demand. First, the energy may be stored in a chemical storage system such as a battery, hydrogen, ammonia 183 and other stored gases (e.g. argon, helium, neon, etc.).

Second, the energy may be stored, as heat in a high, medium, or low thermal fluid (e.g. molten salt, etc.) or as stored cold temperature thermal storage 124 (e.g. ice, phase change materials). High, medium, low and cold temperature working fluid may additionally be placed into an insulated storage vessel to retain the thermal energy in short term as a stored fluid and/or material and/or to use external thermal input to maintain usable thermal energy capability. Low-heat-capacity working fluids may additionally be placed into an insulated storage vessel to retain the heat in short term stored low-heat-capacity fluids and/or to use external thermal input to maintain usable low-heat-capacity fluids capability.

To generate electricity from the stored energy, a chemical-transfer mechanism may selectively transfer chemical from storage 110 to provide on demand energy generation. Additionally, the heat-transfer mechanism energy generation allows the system to selectively transfer heat from thermal storage 110 to provide on demand energy generation. Heat energy without conversion can be used to initiate Stirling engine 116 thermal energy input. Once heat is transferred, heat may also boil a working fluid (e.g., due to the low boiling point of said working fluid), generating steam and/or vapor that is used to rotate rotor blades of a turbine 176. A turbine 176 and/or Stirling engine 116 may generate usable work energy which may then be used to drive an electric generator 114 that supplies electricity to a load or other uses (e.g. providing rotational and/or linear energy for a pump of compressor and/or thermal energy to a thermal intensive application).

Such on-demand generation of energy from stored renewable energy may additionally reduce costs associated with the operation of other power stations to offset fluctuations in energy generation from renewable energy 112. Along the same lines, the use of mechanical elements (e.g., rotation-transmission mechanism, linear transmission mechanism, rotor blades and/or gas/working fluid activated pistons) coupled with specific fluid and friction to store the energy may provide cost savings over scaling conventional energy storage mechanisms such as batteries and/or environmental and area specific limitation constraints of pumped-storage hydroelectricity. In other words, the system of FIG. 1 will facilitate the effective, economical and/or reliable generation of electricity, hydrogen, ammonia, processing of inert gases and other thermal intensive applications with renewable energy 112.

Production of thermal energy is based on the premise that fluctuation of generational inputs is acceptable due to inherent design adaptations that maximize production during high energy generation availability and can scale downward or enter standby mode to match input limitations from lower generational capacity periods. However, generational output of the renewable energy 112 technologies may fluctuate from inherent variations in environmental changes and effectual actions. Furthermore, such fluctuations may prevent the renewable energy 112 generation technologies from balancing energy generation with energy demand (e.g., grid electrical demands, thermal applications and components). As a result the systems may incur costs associated with operating and/or shutting down electric generators 114 powered by other forms of energy (e.g., hydrogen, ammonia, thermal, coal, natural gas, hydroelectric 102 power, nuclear power) in response to changes in electric demand and/or fluctuations in the supply of renewable generated power. The preferred embodiment is accomplished by facilitating electrical, thermal and chemical interactions as well as energy conversions through interconnecting a hybrid wind 104 and solar 106 energy generation system. Alternatively geothermal 100, hydroelectric 102 and other grid 108 energy connected input sources may be substituted. The preferred embodiment's efficiencies and cost effectiveness are made possible from its exemplary energy generation capability, which is a result of the improved and inclusive hybrid energy generation system 178, including its waste heat recovery system, which uses reclaimed energy to actualize and realize the maximum benefits of using all available system resources. Maximizing infrastructure utilization to achieve the lowest possible levelized cost of energy is achieved by monetizing capital intensive fixed assets while reducing overlap and needless redundant processes. The present invention substantially reduces investment capital requirements, encapsulated by enhancing greater return on invested capital expenditures.

Figure 2:
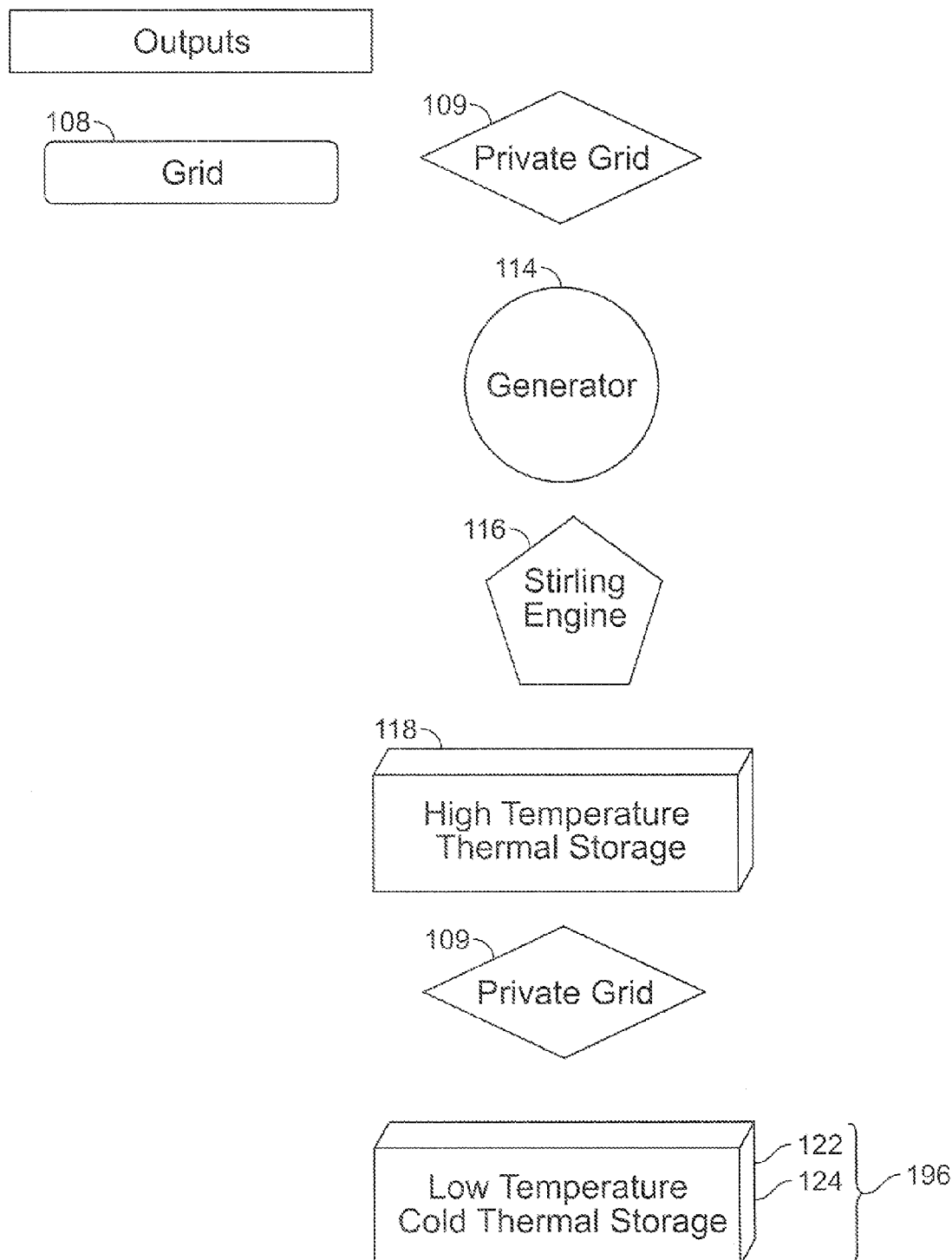
FIG. 2 is a flowchart illustrating the outputs in accordance with the embodiment of FIG. 1.

Referring to FIG. 2, a thermal energy transfer mechanisms in accordance with an embodiment is shown. As mentioned above, thermal energy transfer mechanism will enable the selective transfer of thermal energy from a medium temperature 120 or low temperature 122 storage vessel to a working fluid and/or use in combination with absorption cooling process for communication to cold energy storage 124. Thermal energy transfer mechanism and/or device may include a thermally insulating component such as a thermally insulated pipe and a thermally insulating component. Thermally conductive component may include a metal surface, manifold, conductive rod, radiator and/or other structure that facilitates a thermal energy transfer mechanism. Conversely, thermally insulating component may include a vacuum-insulated panel and/or other thermally insulating material or structure.

The disclosed embodiments provide a system that generates electricity and heat energy for the primary purpose of production of electricity and thermal application use. During operation, the system uses the hybrid mix of wind 104 and solar 106 energy to maximize day and nighttime electrical and thermal energy generation. Connection is made to an intragrid 109 for internal industrial usage or as an external grid energy supplier. Additionally geothermal 100 and hydroelectric 102 or external sources can be used for electrical energy generation input. Generated energy can then be connected to a hydrogen electrolyzer. This stage uses incoming water and electrical currents to separate said water into hydrogen and oxygen gasses. Separated hydrogen and oxygen gases are then moved to purifier and dryer stages to remove impurities and readied for transfer to their associated temporary storage systems. This enables use of the stored gases for output as feedstock and/or processed in further stages into additional products and byproducts.

The present invention includes a concentrated thermal solar collection 126 system which is deployed to collect thermal energy 106. Said thermal energy 106 is transferred and then stored in high 118, medium 120, or low 122 temperature storage vessels as well as processed for cold temperature thermal storage 124. During nighttime and inadequate thermal collection periods, the system taps its reserve of heat 118, 120, 122 and cold 124 thermal storage for application usage or electrical energy generation. Alternatively, geothermal 100 and other electrical and chemical reaction for thermal generation may be used for thermal generation and thermal energy collection.

In some embodiments, selectively transferring the thermal energy from the specific fluid to the working fluid involves disposing a thermally insulating component between the specific fluid and the working fluid to retain the thermal energy in the specific fluid and repositioning the thermally insulating component to transfer the heat from the specific fluid to the working fluid through a thermally conductive component. High 118, medium 120, low 122 and cold 124 temperature thermal storage systems are deployed for the primary purpose of providing on demand thermal energy.

This thermal energy is needed for thermal application and thermal to electrical conversion application use. Additionally, the system deploys a cooling system and chiller system to provide proper pressure and cooling for the localized cold storage 124 system and for further cold temperature application requirements for both active and passive usage. High 118, medium 120, low 122 and cold 124 temperature thermal storage systems are also deployed for the secondary purpose of providing thermal energy needed for thermal exchange using a transfer fluid or a work fluid to cause a turbine's shaft to rotate to cause rotational work energy and/or a Stirling cycle 116 applications gas and/or working fluid expansion and contraction to cause usable work. The working fluid can also cause gas and/or working fluid expansion and contraction applications to cause force on a piston to cause motion for the purpose of providing usable work. Some embodiments use rotating blades including at least one of a propeller, an impeller, one or more paddles and/or a drum. Some embodiments use a working fluid that is associated with a low boiling point. Working fluids can then be reclaimed for energy recycling and processed for system reuse.

In some embodiments, the system also uses an insulated vessel 110 or geothermal storage to retain the heat in the specific fluid. In some embodiments, the thermally conductive component is a component having high thermal conductivity, such as a metal surface, a manifold, a conductive rod and/or a radiator. Finally, the system uses the transferred rotational energy to generate work or torque.

Additionally, in some embodiments, the transferred specific fluid boils the working fluid. Rotational energy may then be generated by exposing a compressed gas and/or working fluid in a cylinder to expand the gas, and/or working fluid to provide force to a piston which then exerts the movement to a rotation on a crankshaft 202 or of linear movement of a linear generator 114. Rotational energy or linear movement is used to drive applications or components such as a mechanical linkage, swash plate, compressor, pump or electric generator 114.

Generated rotational and/or linear work energy is utilized by transferring the shaft rotation and/or linear movement to provide a water pump the energy needed for incoming water to become pressurized to force water through the water purification systems for example consisting of desalination, distillation and/or reverse osmosis and then stored in tanks and/or elevated water tanks as additional energy storage 110 for on to demand use. Next, generated rotational and/or linear work energy can be used to provide rotational and/or linear energy to drive compressors to establish adequate operating pressure. This in turn enables pressure swing absorption to junction properly. This process allows separating, isolating and storing gases and/or working fluid as an additional energy storage 110 for on demand use. Lastly, generated rotational and/or linear work energy can be used to provide rotational and/or linear energy to drive generators 114 to provide electrical energy production. This energy can then be transferred into the internal grid 109 network for system use, for additional hydrogen production through powering electrolyzers or made available as a grid energy supplier.

Figure 3:
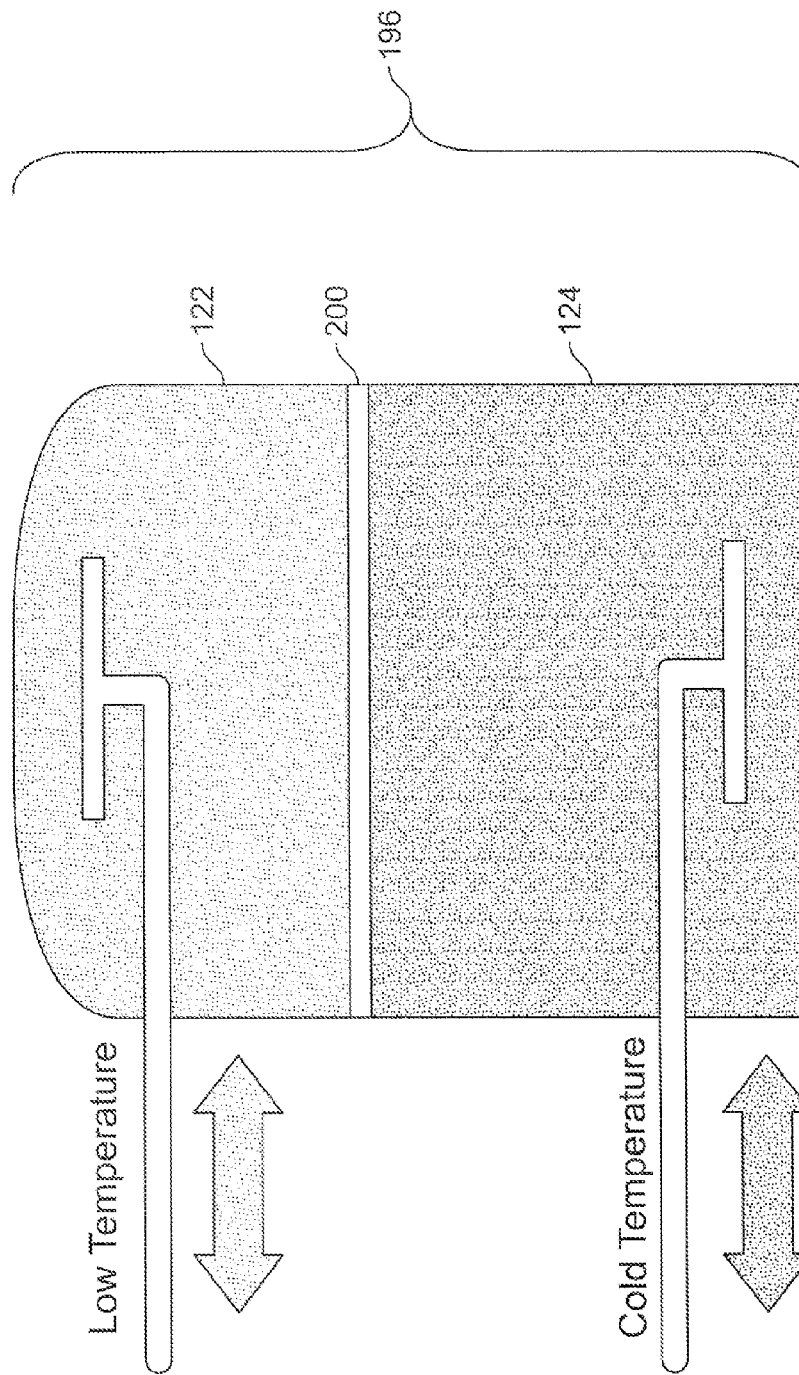
FIG. 3 is a schematic according to one or more examples of an embodiment of a stratified thermal storage vessel in accordance with the present invention.

Referring to FIG. 3, a stratified thermal energy storage vessel 196 is shown. In an embodiment of the present invention, medium and low temperature thermal energy fluids can be stored in the same storage vessel 110. The use of a thermocline 200 with separated medium and low temperature loop interfaces is required as illustrated. In an embodiment of the present invention it is contemplated the medium temperature storage section 120 would hold fluid at or about 15.56° C. (60° F.) and the low temperature storage 122 section would hold fluid at or about 4.44° C. (40° F.). The specific arrangement of steps shown in FIG. 3 should not be construed as limiting the scope of the embodiments.

Figure 4:
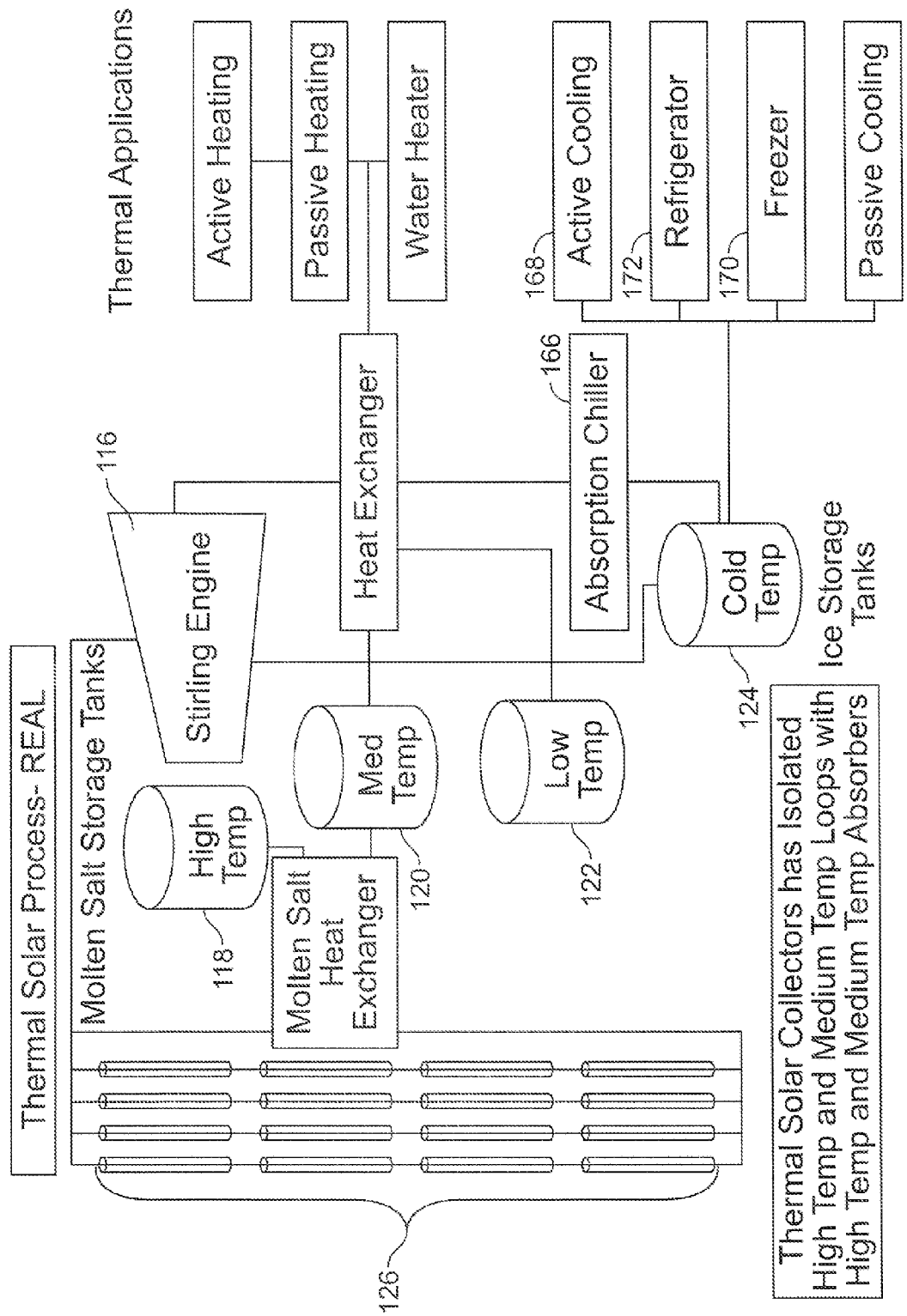
FIG. 4 is a flowchart according to one or more examples of an embodiment of a thermal solar process in accordance with the present invention.

Referring to FIG. 4 next, a flowchart of the thermal solar process of an embodiment is shown. The insulated vessels shown facilitate the storing of energy from the renewable energy 112 in the heat-capacity fluid. The stored energy may then be used to generate electricity and thermal energy based on energy demand associated with energy requirements. To generate electricity from the stored energy, the chemical and/or heat from the associated storage 110 of specific fluid may be selectively transferred from the specific fluid to the working fluid. For example, a thermally insulating component may be disposed between the specific fluid and the working fluid to retain the heat in the specific fluid. During periods of low solar 106 and/or low wind 104 and/or high electrical demand, the thermally insulating component may be repositioned to transfer the heat from the specific fluid to the working fluid through a thermally conductive component such as a metal surface, a manifold, a conductive rod and/or a radiator. Finally, the transferred heat in the working fluid is used to generate electricity. More specifically, the working fluid may be associated with a low boiling point, such that the transfer of heat from the specific to the working fluid quickly boils the working fluid. Vapor and/or Steam from the boiled working fluid may then be used to rotate a turbine's rotor blades and the turbine 176 may be used to drive a rotational device for usable work and/or a Stirling engine 116 may be used to create usable work from the thermal energy directly.

Figure 5A:
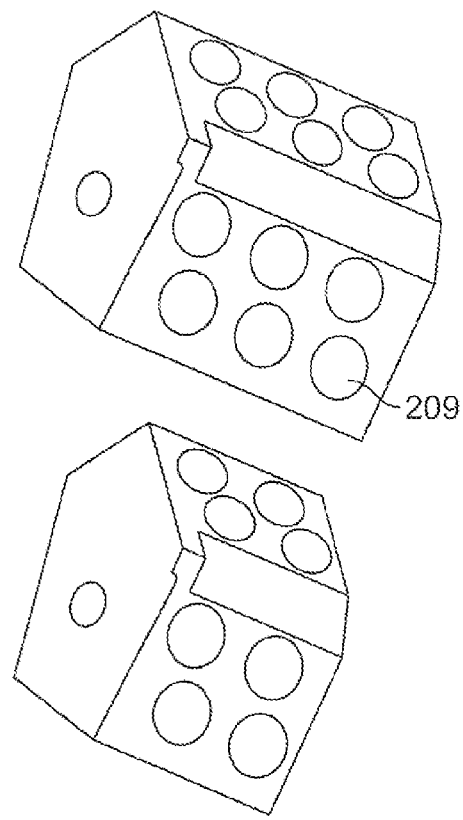
FIG. 5a is an overall schematic view according to one or more examples of an embodiment of a Stirling engine block of cylinders in accordance with the present invention.
Figure 5B:
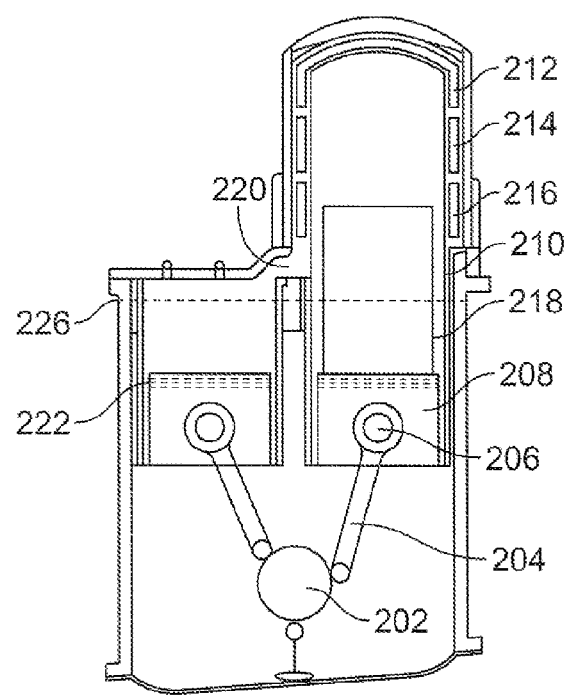
FIG. 5b is a schematic according to one or more examples of an embodiment of a section end view of a single Stirling engine with dual pistons in accordance with the present invention.
Figure 5C:
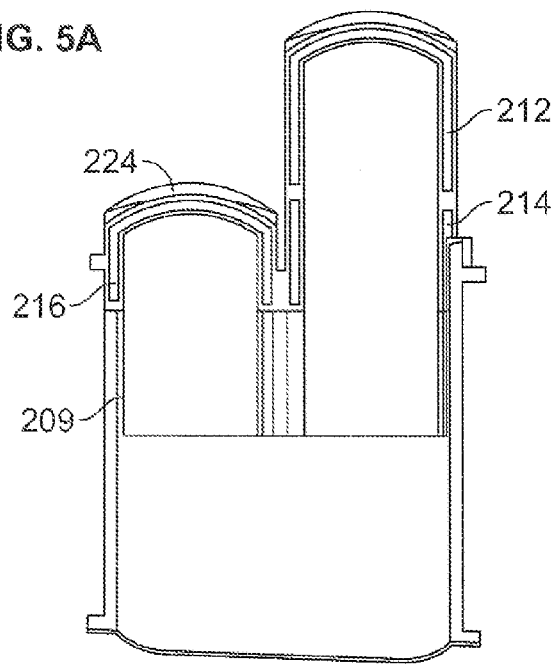
FIG. 5c is a schematic according to one or more examples of an embodiment of a section end view of a single Stirling engine with only the changes necessary and needed for scaling engine design in accordance with the present invention.

Referring to FIG. 5, the preferred embodiment of the Stirling engine 116 of the present invention is depicted. FIG. 5a depicts the overall Stirling Engine 116 block. FIG. 5b depicts a section end view of a single Stirling engine 116 with two pistons incorporating the invention. Finally FIG. 5c depicts a section end view of a single Stirling engine 116 incorporating the invention. The crankshaft 2112 is attached by connecting rod 204, to a wrist pin 206 and expansion piston 208; which said expansion piston 208 reciprocates in an expansion cylinder 210. Surrounding the expansion cylinder 210, and connected in series with it, are a thermal exchanger 212, regenerator 214, cooler 216 and sheath cylinder 218. Beneath the cooler 216, is a duet 220, connecting said cooler 216 with compression cylinder 209. Inside said compression cylinder 209 reciprocates the transposed compression piston. As shown in FIG. 5b, the compression piston comprises an outer cylindrical portion, rings 222, conic section 224 and head gasket seal 226.

The preferred embodiment of the present invention consists primarily of rows of transposed compression piston and cylinders for the single engine twin cylinder Gamma Stirling engine 116. This allows for engine configurations in a linear "V", double "V", "W" and/or radial type piston arrangement. A single connection on the crankshaft 202 may be attached to one or more connecting rods 204; one connection going into each of the like-aligned cylinders. In the hot side cylinder 212 is a conventional expansion piston 208, attached by a wrist pin 206 to its respective connecting rod 204. The engine's thermal exchanger 212, regenerator 214 and cooler 216 are arranged in an annular design around this cylinder 212.

In the compression side cylinder 209 is a conventional compression piston, attached by a wrist pin 206 to its respective connecting rod 204. The engine's cooler 216 may be arranged internally and/or as an annular design around this cylinder; during scaling the cooler 216 may be proved to inline with the compression cylinder 209. An object of the present invention is the development of a generic Stirling cycle in which the thermal chambers may be of identical design with mass production, but primarily in which cylinder wall is kept thin to reduce material usage requirements and weight, lastly while maintaining reduced energy input requirements. In the multi-cylinder Stirling cycle thermal engine 116 described, the cylinders are arranged in two rows. The cylinders of one row are staggered relative to the cylinders of the other row and the longitudinal center axis of one row forms an angle with the longitudinal center axis of the cylinders of the other row. Additional rows and layouts may be added up to and including a multiple row radial engine design.

Close to the crankshaft 202 is the inner portion of the cylinder, comprising a large bore in which the compression piston ring(s) 222 and/or seal(s) rides. The connecting conic section 224 incorporates a port communicating directly to the cooler 216. Beyond the conic section 224 is a small bore (relative to the large bore previously described) outer portion of the compression cylinder 209, which essentially extends the cylinder to accommodate the long connecting rod 204. This outer portion of the cylinder will absorb the side loading of the piston due to connecting rod angularity. As used herein, "inner" and "outer" refer to a component's relative proximity to the crankshaft 202, which is the center of the engine 116. The compression piston is transposed so that its seal is farther from the crankshaft 202 than are its wrist pin 206 and side-load bearing portions. The piston comprises a large diameter inner portion which carries the ring(s) 222 and/or seal(s) with a loading and wear area. A conic section 224 connects the inner portion of the piston with a 'cylindrical' outer portion of a smaller diameter, which contains a sealed wrist pin 206 and a wear area. Sufficient clearance or other relief means is provided in the outer portion of the piston to permit lubrication while limiting passage of the working gas among all parts of the cylinder at all times. Pressure release and gas transfer is accomplished through the relief passage pathway heat exchanger 212 and inline regenerator 214 for transfer to the compression side cylinder. This relief means may be located external to the cylinder, rather than in the cylinder piston. The diameter of this outer portion of the piston is as tight a clearance and as small a tolerance as possible, consistent with the loads it most bear, to minimize the dead volume ratio associated with it and its relief means. To facilitate good dynamic balance, the compression piston is designed to have the same material mass as the expansion displacer piston 208, which is counterbalanced on the crankshaft 202. The offset staggered linear arrangement of cylinders in rows will allow the system to use a common crankshaft 202 and allow the cylinder block to be a continuous sandwiched cylinder block to house, support and/or encase all cylinders.

The preferred embodiment of the current invention uses the side-by-side alignment of the displacer side cylinders for the benefits of allowing the use of casting the head and multiple cylinders as a single manufacturing piece block to simplify sealing the engine, allow for a much higher power engine with a linear offset diagonal rows of cylinders and to enhance mass manufacturing capabilities while still using a single crankshaft design. Additionally, with the placement of displacer and compression cylinders 209 of the current design, separate heads for each cylinder can be also implemented.

An additional method is the inclusion of a rotary disc valve (more commonly used in motorcycle two cycle internal combustion engines), which may be used for higher pressure builds when built between the compression and displacer cylinder gas exchange pathways. This may also be accomplished when exchanged in a pathway between the cylinders with a standard combustion engine type intake/exhaust valve using the crankshaft 202 with a lobe or with the addition of a camshaft to provide the timing and work to open the valve.

The engine lubrication system for the cylinder, piston, piston rings 222, rod bearing and potentially for valves, if used, is designed to deliver clean oil at the correct temperature and pressure to every part of the engine. The oil is sucked out the sump into the pump, being the heart of the system, then forced through an oil filter and pressure feed to the main bearings and to the oil pressure gauge. From the main bearings, the oil passes through feedholes into drilled passages in the crankshaft 202 and onto the big-end bearings of the connecting rod 204. The cylinder walls and piston pin bearings are lubricated by oil fling dispersed by the rotating crankshaft 202. The excess oil is scraped off by the lower ring 222 in the piston. The excess oil then drains back to the sump, where the heat is dispersed to the surrounding air. When the crankshaft journals become worn, the engine will have low oil pressure and throw oil throughout the inside of the engine. The excessive splash can overwhelm the rings 222 and cause the engine to leak oil into the compression chamber area of the cylinder. Worn bearing surfaces can be restored by simply replacing the bearing inserts. At the moment that sufficient oil is circulated through the system hydrodynamic lubrication manifests and reduces the progress of bearing wear and reduction in cylinder wall friction and heating.

Piston rings 222 provide a sliding seal preventing leakage of the fuel/air mixture and exhaust from the combustion chamber into the oil sump during compression and combustion. Secondly, they keep oil in the sump from leaking into the combustion area, where it would contaminate the working fluid transfer. Between the piston rings 222 and the cylinder wall of a well maintained engine, hydrodynamic lubrication exists. This is essential for the lowest friction and wear. In the top and bottom dead center where the piston stops to redirect, the film thickness becomes minimal and mixed lubrication may exist.

To realize a good head transfer from the piston to the cylinder, an optimal sealing and a minimum of oil bleed, a minimal film thickness is desirable. The film thickness is kept minimal by a so called oil control ring. This ring is situated beyond the piston rings 222 so that the surplus of oil is directly scraped downwards to the sump. The oil film left on the cylinder wall by the passage of this ring is available to lubricate the following ring. This process is repeated for successive rings 222. On the up stroke the first compression ring is lubricated by the oil left behind on the cylinder wall during the down stroke. Leakage of the gas from the compression chamber into the oil sump results in performance degradation. This is the reason why, despite frequent replenishment of oil, maintenance consisting of an oil change may remain essential. The multi-cylinder Stirling engine 116 of this invention provides a simple and practical method to improve the performance and life of a multi-cylinder, multi-piston Stirling engine 116 without at the same time increasing its complexity or decreasing, its-mechanical efficiency. It is generally accepted and agreed upon that the double-acting two piston Stirling engine is one of the most desirable forms of Stirling for high energy applications, having demonstrated both simplicity and good performance. Such Stirling engines may be designed in a variety of forms; for example, cylinders may be arranged in a single and multiple row linear, inline "V", double "V", "W" and radial layout type piston engine design configurations.

One of the most desirable arrangements is the double "V" type engine, in which the cylinders are generally located radially off of a standard crankshaft connection. This layout provides simplicity and strength, proper piston phasing for the Stirling cycle and excellent dynamic balance. There is a tradeoff that occurs with respect to the connecting rods 204. Namely, as the connecting rods 204 are made proportionally longer, the longer cylinder stroke causes the heads to be placed farther apart, thus requiring larger plenums and heat exchangers 212, with increased performance-robbing dead volume ratio, that evolves from the space between them. The other factor is the choice of optimal efficiency compact heat exchangers 212 and connecting plenums will be left with non-optimal performance due to short connecting rods 204, and the design that has efficient long connecting rods 204 will be left with non-optimal performance due to large dead volume ratio in the heat exchangers 212 and associated plenums.

The present invention discloses a new form of Stirling engine compression piston and cylinder 209 that will allow the engine designer to incorporate compact heat exchangers 212, efficient regenerator 214, plenums and efficient long connecting rods 204, on the double "V" type Stirling engine 116. The present invention Stirling engine 116 is a transposed compression piston and cylinder 209 for the double "V" type two piston engine which allows the cylinders 209, 210 to be connected by compact heat exchangers 212 and transfer channels, while retaining the use of mechanically efficient long connecting rods 204.

In one example, a crankshaft 202 is mounted in a bore that transversely intersects two cylinders 209, 210 arranged wherein one of said cylinders extends vertically from the crankshaft 202 bore and the other extends horizontally. Each crank throw on the crankshaft 202 is attached with one of the two connecting rods 204, one going into each of the two cylinders 209, 210. In the vertical cylinder is a conventional expansion piston 208, attached by a wrist pin 206 to its respective connecting rod 204. The engine's neater 212, regenerator 214 and cooler 216 are arranged in an annular fashion around this cylinder. During Stirling engine design scaling, the cooler section 216 is moved from inline with the displacer cylinder 210 to inline with the compression cylinder 209 to allow more mass volume contact without incurring excessive dead space ratio creation as shown in the included Stirling engine cutout (FIG. 5c) described below. The horizontal compression cylinder 209 has two concentric bores along a common extended axis, with a conic section 224 connecting them. Close to the crankshaft 202 is the inner portion of the cylinder, comprising a large bore in which the compression piston ring 222 and/or seal rides. The connecting conic section 224 incorporates a port communicating directly to the cooler 216. Beyond the conic section 224 is a small bore (relative to the large bore previously described) outer portion of the compression cylinder 209, which essentially extends the cylinder to accommodate the long connecting rod 204. This outer portion of the cylinder will absorb the side loading of the piston due to connecting rod angularity. The compression piston comprises a large diameter inner portion which carries the ring 222 and/or seal and a small wear area. A conic section 224 connects this inner portion with a cylindrical outer portion of a smaller diameter containing a sealed wrist pin 206 and a large wear area. To facilitate suitable dynamic balance, this piston is designed to have the same physical mass as the expansion piston 208, which is counterbalanced on the crankshaft 202.

Reversing the Stirling cycle and providing energy input in the form of linear or rotational input will allowing a Stirling cycle thermal engine 116 to perform a cooling application process. Instead of cooling the compression side and providing a heat source applied to the displacer side otherwise known as the displacement side, a thermal transfer exchanger is used in replacement of a heat exchanger 212 and heat input, consisting of a device such as a thermosiphon or other past prior art thermal transfer methods for the purpose of cooling an appliance, storage space or substance of gas and/or liquid. This cooling process may be used for refrigeration 172 or can extend to provide supercooling or cryo-oolong level temperatures to liquefy gases or for providing the cooling of such substances or other thermal required applications.

The preferred embodiment for the hybrid energy generation system 171 consists of two core elements. One element consists of the thermal solar energy collection modules 126 with an associated centrally located absorber for thermal collection and the other element is the thermal energy storage system for ideal hot and cold based storage 110. The preferred embodiment for the central thermal solar 106 system is modular design construction, consisting of rows of rectangular panels with parabolic shape and a central axis on each row, giving them the ability to track the sun and focus reflected light onto the closest absorber.

The preferred embodiment for the horizontally mounted thermal solar absorber includes a pipe-like structure to be mounted parallel above the horizontally mounted solar panel 136 segments and absorb the focused solar 106 energy from the panels below. The absorber will itself also has a rectangular panel with parabolic shape mounted above the absorber to cause reflected solar 106 energy from the below panels that extends past the absorber to be reflected back upon the top of the absorber to cause efficiency enhancement with a nearly 360 degree solar 106 contact upon the absorber surface. The preferred embodiment can be adapted to various configurations using shapes and layouts to match the available site specific usable solar area for installations.

Figure 6A:
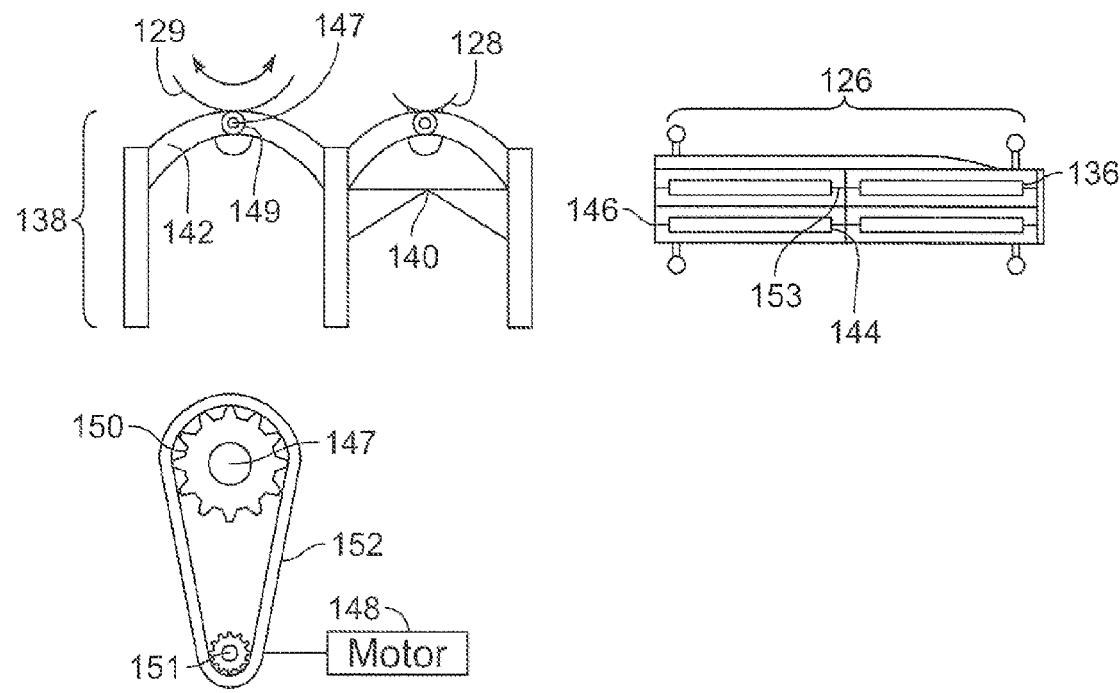
FIG. 6a is a schematic according to one or more examples of an embodiment of an absorber field unit ("AFU"), the reflector panels positioned between two dual collectors units. The AFU and the reflector panel are shown in relationship to the angle of the sun's apparent representation to the dual collector units. The position and orientation of the reflector panels is optimized for maximum reflected energy.
Figure 6B:
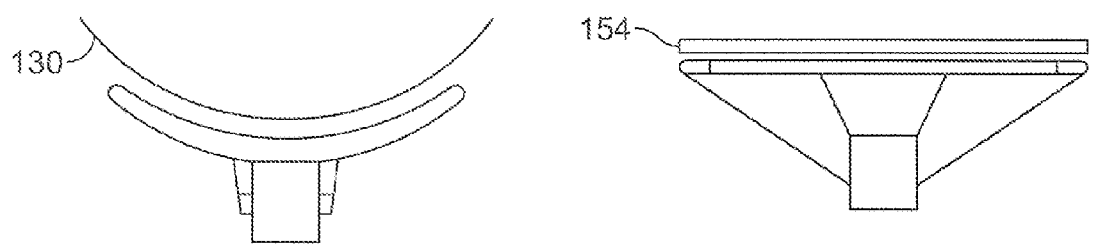
FIG. 6b is a schematic according to one or more examples of an embodiment of a solar-thermal collector and solar photovoltaic apparatus in accordance with the present invention.

Referring again to the drawings, FIG. 6a shows a schematic view of a Thermal Solar Field Unit 1000 ("TSFU"), comprised of multiple rows of reflectors 130, between two adjacent AFU dual collectors 164 elevated by a suspension cable bridge 132 (FIG. 6c), FIG. 6b shows a schematic of ground base supports 134 with a mounting bracket and the reflector 130 and/or photovoltaic panel 154.

A multitude of AFUs aligned parallel with the reflector panel 136 rows and connected to respective high temperature and medium temperature loops comprises one Energy Generation Module ("EGM"). A multitude of EGMs comprises the Solar Thermal Array Conversion System ("STACS") Field. Based on optimization strategies, the reflectors 130 may target either of the two dual collectors 164 on the edges of the TSFU. Pending on which side of the targeted dual collector 164 the reflector panel 136 is located in relationship to the sun's position; there are Passive solar 129 and Contra 128 arranged solar reflectors 130. The Passive solar reflectors 129 are on the same side of the dual collector 164 as the sun. The Contra arranged solar reflectors 128 are on the opposite side of the collector 164 in relationship to the sun. Similarly the collector 164 that is on the "sun's side" of the TSFU may be referred to as Passive solar dual collector 164. The dual collector 164 that is on the opposite side of the sun may be referred as Contra arranged solar collector. Contra solar reflectors 128 target Passive solar dual collectors 164 and vice-versa.

FIG. 6a also shows one embodiment of the rotating solar reflector panel 136 assembly. It illustrates the junction of two adjacent reflector panels 136 in a row of connected reflector panel structures. The reflective panel surface is a parabolic slightly curved mirror adhered to a supportive platform. The supportive platform consists of a truss-bridge type support structure 138 comprised of longitudinal beam 140, cross beams 142, trusses 144 and crescent-like end-pieces 146. This circular-arch-shaped crescent provides the rotational freedom to the reflector 130 around the center of its symmetry. The rotational axis 147 is co-aligned with the center of gravity of the reflector panel 136 structure to provide smooth, balanced rotation for the tracking mechanism. The crescent is formed from the support structure 138.

The two adjacent reflector panel 136 structures are connected via flex-fit sleeves 153. The reflector panel 136 structure attached to one end of the reflector panel 136 structure freely slide into a sleeve 153 attached to the other end of the adjacent reflector panel 136. The flex-fit drive sleeve connection transfers rotational torque from one panel 136 structure to another panel 136 structure and allows for longitudinal thermal expansion. The driving sleeve 153 is one component and embodiment of positioning and orienting system of the reflector panel 136 row. The drive-train of the tracking system is mounted on the support structure 138. A single function electrical step-motor 148 is the drive of the train. It provides rotational drive. The rotational tracking movement of the reflector panel 136 is executed via a gear 150 or sprocket driven system with a roller chain 152 secured to the circumference of the panel gear 150 and a corresponding gear 151 attached to the step-motor 148.

FIG. 6b further illustrates an end carriage assembly providing support and drive for a connected reflector 130. A middle carriage assembly provides support and drive for two connected reflectors 128, 129. Guiding for the carriage on the rail is provided by a bearing 149 with a base support for thermal panel 130 or photovoltaic panel 154. The side rail's provides the stability and the supporting crescent shaped cross supports 146 for security of the reflector structure in case of strong winds. Part of this wind protection system is the drive sleeve 153 that connects reflector panels 136 securing them to the carriage through the bearing mount in case of lift from wind flows.

Figure 6C:
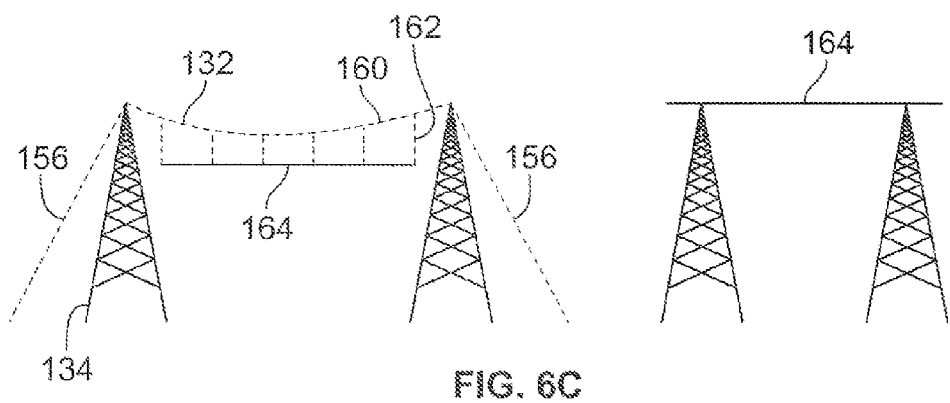
FIG. 6c is a schematic according to one or more examples of an embodiment of an overall view and some details of the ultra-light, cable-truss-bridge structure of the collector in accordance with the present invention.

FIG. 6c is an overall side view of the ultra-light, pre-stressed cable supported, truss-bridge structure of the dual collector 164. The tension-cable structure 156 provides support with a suspension cable bridge 132 given the required rigidity of the large-span bridge. The suspension cable truss bridge 132 structure will provide bottom support for the flexible suspended cable supports.

The solar absorber is comprised of a single and/or a multitude of pressurized working fluid tubes, high temperature absorber tubes 160 and medium temperature absorber tubes 162; freely laid over and supported on suspended guy-wire cables. The supporting portion of the cable is covered with rolling beads of cylindrical or oval shape forming a rolling "beaded necklace" type support for the tube. In the center of the absorber, a rolling pin supports the tubes such that thermal expansion is not prevented by friction or other force of resistance on the side, bottom or any other area.

A lightweight yet durable sheet material with a high emissivity surface is used for the secondary reflector 130. The parabolic reflector profile is uniquely shaped to provide optimum ratio of aperture-to-absorber width, as well as to capture and to entrap most, if not the majority of all reflected energy. The function and benefits of the choice for the absorber and its coating are: emissivity; reduction of mass flow friction of working fluids; convective heat losses of the collector; resistance to high temperatures; low cost; and simple maintenance. The flow distribution and control of the thermodynamic properties of the fluid throughout the absorber grids of the EGM is of a key importance for high thermal efficiency of the solar 106 energy generation.

The preferred method of positioning and orienting the reflector 130 and/or photovoltaic panels 154 and the field of travel of reflected energy of the collection area is continually maximized and optimized for highest efficiency. Thermal panels are rotated with a fixation of reflected energy upon an elevated linear receiver comprising primarily of a dual absorber 164 and associated reflector 130 and/or radiator having a high temperature and medium temperature thermal fluid flow loop capture. Crescent like cross supports 142 at intervals along the support rails offer stable reflector panel support and wind stabilization while allowing reflector panel rotation to occur unimpeded and providing for clearance of potential seasonal snow and ice buildup. The parabolic optimal aperture curvature of the reflector panels 136 are fixed for each row of the field allowing for optimized mass production and ease of shipping, handling, installation and cleaning.

A lightweight, medium temperature collector-absorber 162 structure is mounted via physical connection to the upper reflector 130; a cable-suspension-bridge 132 supports the absorber; a guyed cable hanger supports the centrally mounted high temperature collector-absorber 160. Guyed cable array cross supports connected to each medium temperature absorber 162 connected via the outside connection points contributes to additional support and stabilization while reducing impacts to horizontal reflector energy collection mass area. This design allows for a modular approach to layout design for highly flexible system sealing. Alternately a truss support system can be mounted from the ground to support the AFU. This type of solar thermal collectors 126 shall herein be referred to as Compact Linear Parabolic Reflectors ("CLPR") and are used for their simplicity and cost effectiveness. They are fields of parabolic or quasi-parabolic reflector 130 "strips" (long and narrow panels) arranged in parallel rows and oriented to a common dual collector 164 and/or absorber with common reflectors 130 located at a certain height above the reflector field. Reflector 130 panels can be directly exchanged for Photovoltaic panels 154 of similar size to provide localized electrical generation for localized energy needs.

The dual collector 164 and/or absorber is a pipe-like, long and narrow structure, aligned in parallel with the rows of reflectors 130 designed to collect the energy from the reflector field. Dual collectors 164 and/or absorbers collect the reflected energy from multiple reflector 130 rows on each of its sides. For discussion purposes the basic unit of the field is defined as two adjacent dual collectors 164 with the attached third top reflector 130 and the bottom reflectors 130 below them. In theory any bottom reflector 130 can serve any of the four collectors 164. Multitudes of these absorber field units ("AFU"s)—lined up in parallel with the reflector rows—make up the solar collector field area, representing its cyclic linear layout symmetry.

The known reflectors have a single axis or degree of freedom that is a pivotal, rotational motion along their longitudinal axis. A tracking system rotates the reflectors and follows the sun's apparent movement. The orientation of the mirrors is such that the reflected incident sunlight "redirects" to one of the high heat collector and/or absorber 160 of a dual collector 164 at the edges of the absorber field unit (AFU), thereby each reflector panel row is "fixated" to a dual collector 164. Some of the known prior art technologies have mechanical linkages connecting the rows of reflectors into a single tracking array.

The present invention's approach ensures that the rotation angle of each row in the array is focused for optimal emissivity of energy reflection and that all mirrors in the linear row are focused to the same dual collector 164. Some prior art technologies prefer a North-South alignment of the rows, while other prior art prefer East-West alignment of the field. To describe the location as well as the orientation of the reflector rows in reference to the collectors, the following terminology is used: Contra arranged solar 128 rows are the rows that are on the opposite side of the tracked collector relative to the sun (on the polar side of the collector in the East-West aligned field or West-Side reflectors during the morning in the North-South aligned field). The Contra arranged solar reflectors 128 have a larger "common" surface area exposed to the sun's rays. Therefore, they have higher optimum reflection potential. Passive solar rows 129 are the rows on the same side as the sun relative to the tracked collector (equatorial side of the Fast-West aligned field or the East-side reflectors during the morning hours and the West reflectors during afternoons for the North-South aligned field). The Passive solar 129 rows have typically less exposed normal surface, thus they are less than optimal.

The purpose of the collectors 164 is to maximize the absorbed solar 106 radiation by capturing the maximum energy from the reflector panels 136 and by minimizing the radiation and convection losses of the dual collector system. Thermal transfer mediums and working fluids such as molten salt, oil, water, water/glycol mixture and/or other liquid mediums is circulated through the high temperature 160 and medium temperature 162 absorber as the heat transfer (or working) fluid. The absorber surfaces of the collectors are in effect, absorber surfaces, since the collected solar 106 heat is directly used for high temperature and low temperature thermal energy use and storage 110. The present application thus describes an expanded travel, ultra-compact reflector panel field, where the reflector panel 136 rows have a new, dual absorber 164 and an absorber-mounted reflector panel 136 for reducing overspread of reflected concentrated light on a single absorber while allowing the second medium temperature absorber 162 to enhance direct thermal reflection energy collection and from radiated thermal energy from the primary high temperature absorber 160. The present application thus describes an additionally seamless method of integrating photovoltaic cells by interchanging, as a direct replacement for parabolic reflector panels 130, to provide local electrical generation supply and/or energy to charge batteries for activating tracking motors 148, flow valves, other electrical-powered sensor components and/or control systems. This option would eliminate the need for remote power for system functions.

The present application thus describes an additional method of integrating remote electrical components with a localized energy generation source, battery backup and wireless interface and control. The present application thus describes an additional method of integrating remote electrical components with a localized energy generation source, battery backup and wired interface and control with the need for only wired control signal connections, which reduces or eliminates the need for installation and maintenance of electrical lines for remote power.

Prior art also allowed losses from the remainder of the energy not directly hitting the collector and/or absorber to be radiated into the atmosphere. Additionally, prior art suffered losses from the reduced temperature distribution on the top 20-35% of the absorber having less energy from no concentrated reflection for absorption.

An additional benefit of the absorber-mounted reflector panel 136 is to cause overspread sunrays from the reflector field below to be redirected and reflect upon the top surface of the primary high temperature absorber 160. Creating a normalized thermal distribution over the entire surface area when compared to prior art, which effectuated only 70% of the bottom section and up part of the sides of an absorber surface with thermal energy from the below reflector panel field.

The rotating rows of the present invention have the ability to adjust and optimize their position between two dual collectors 164 and the top reflector 130 unit such that the reflected sunlight from the field as a whole is maximized throughout the day and throughout the year. The present application further describes the carriage rail apparatus of the expanded travel reflector panels. This device provides the linear and rotational mobility of the reflector panel structure as well as the tracking and positioning required for maximizing the reflected energy of the AFU. The present application further describes the ultra-light, high-efficiency collector-absorber structure. The assembly has a simple common replication for mass manufacturing, advantageous for construction and field erection.

The features of the collector are: wide aperture, optimized curvature of the secondary reflector surface, suspension cable bridge absorber supports, rolling-bead cable suspension of absorber and pre-stressed cable-bridge support structure. The present application further describes the crescent like cross support 142 rail of the reflector 130. The gravitational center line of the reflector panel 136 structure is in the rotational center 147 of the panel rail. The parabolic curvature of the reflector 130 is a normalized standard for each row of the AFU. The present application further describes the flow distribution and control method of the high temperature and medium temperature generation systems. Each absorber of a collector comprises a single tube. The field comprises a multitude of absorber grids. Optimal control of the thermodynamic conditions (pressure, temperature, velocity and phase) throughout the entire thermal grid is provided for by a localized monitor, analysis and control system with interconnectivity and ULTRAGRID™ 194 compatibility.

Figure 7:
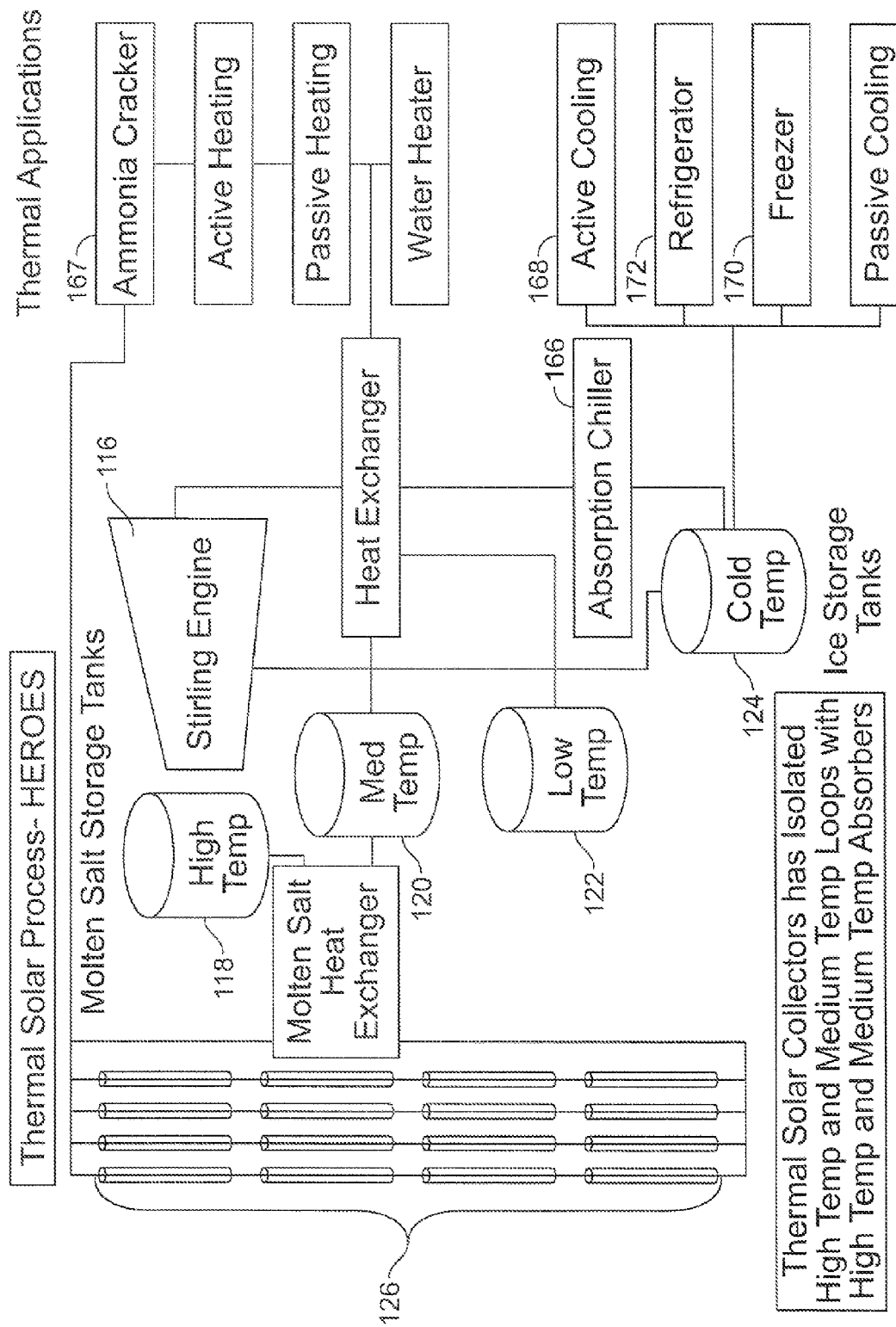
FIG. 7 is a flowchart according to one or more examples of an embodiment depicting the common connections of the Hydrogen Energy Renewable Operated Energy Station ("HEROES") in accordance with the present invention.

Referring to FIG. 7 a flowchart of an embodiment of the solar thermal process is shown. The preferred embodiment for the Thermal Energy Storage ("TES") system consists primarily of a high temperature storage vessel 118, medium temperature storage vessel 120, low temperature storage vessel 122 and lastly a cold temperature storage vessel 124. Additional improvement is an additional thermal storage 110 vessel consisting primarily for hot water storage that doubles as a waste energy thermal storage 110.

As shown in FIG. 7, the preferred embodiment uses high temperature stored thermal energy as energy input for an ammonia based cooling process 166 to initiate and provide temperature support energy for low temperature storage vessel 122 energy input. The preferred embodiment uses high temperature stored thermal energy as energy input for a hearing process to initiate and provide temperature support energy for space heater, room, area or building heating system. The preferred embodiment uses cold temperature stored thermal energy as energy input for attractive cooling process 168 to initiate and provide temperature support energy for central air conditioning and cooling. The preferred embodiment uses cold temperature stored thermal energy as energy input for an active cooling process 168 to initiate and provide temperature support energy for refrigeration 172 appliances, walk-in refrigerators, wine storage areas, box and water cooling. The preferred embodiment uses cold temperature stored thermal energy as energy input for an active cooling process 168 to initiate and provide temperature support energy for freezer 170 appliances, walk-in freezers, box freezers.

The preferred embodiment consists of a Stirling cycle using the available stored high temperature thermal energy to initiate gas and/or working fluid expansion for the generation of rotational and/or linear movement. The preferred embodiment consists of a Stirling cycle using the available stored low temperature thermal energy to initiate gas and/or working fluid contraction for the generation of rotational and/or linear movement. The preferred embodiment uses generated rotational and/or linear movement applied to a generator 114 for the production of electrical energy. The preferred embodiment uses recycled thermal waste heat from the Stirling cycle as energy input for a heating process to initiate and provide temperature support energy for a space heater, room, are or building heating system. The preferred embodiment also uses recycled thermal waste heat from the Stirling cycles as energy input for a heating process to initiate and proved temperature support energy for water heating applications.

Figure 8:
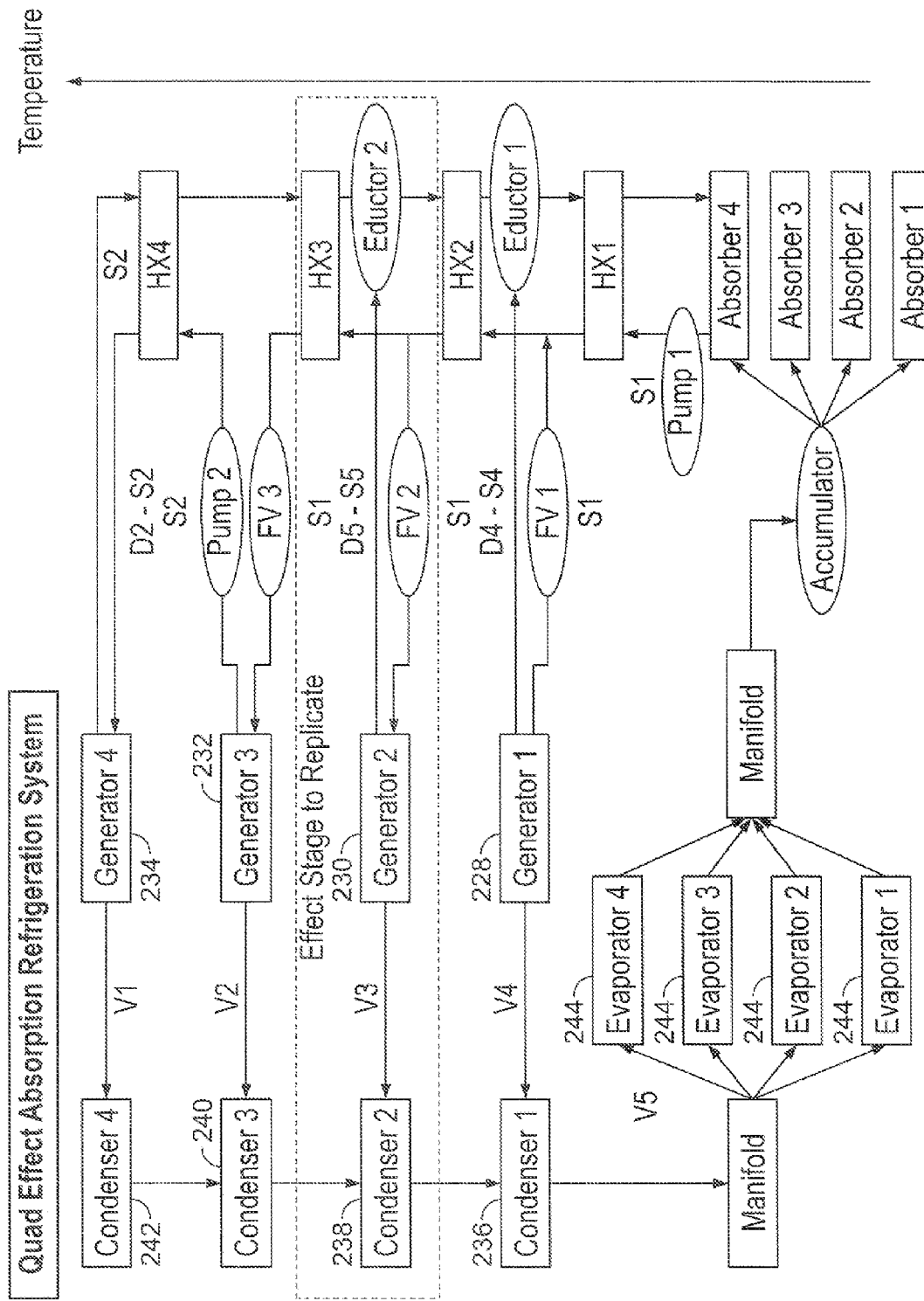
FIG. 8 is a flowchart according to one or more examples of an embodiment of a multi-effect refrigeration process in accordance with an embodiment.

Referring to FIG. 8 a schematic of the quad absorption refrigeration system is shown. In a quad effect absorption refrigeration system, solution flows from an absorber to the first 228, second 230, third 232 and fourth 234 generators connected in parallel. Solution exiting the first generator 228 returns to the multi-absorber system. Solution exiting the second generator 230 flows to a third generator 232 which flows to the fourth generator 234 connected in series with the second generator 230. Refrigerant vapor from each generator is condensed in a respective condenser 236. The fourth condenser 242 exchanges thermal energy with third generator 232, the third condenser 240 exchanges thermal energy with the second generator 230 and the second condenser 238 exchanges energy with the first generator 228.

The preferred invention cooling system includes an improved multi-effects, multi-stage absorption refrigeration system, more particularly to obtain increased efficiency refrigeration effect stages relative to the quantity, quality, pressure and temperature of the available thermal energy input. This is effectuated through strict observation to a tight range of thermal energy input temperature bands as each band affects steps and stages with relationships directly coupled to a particular stage and level of cooling. This can be examined and compared with a typical, yet generic, one size fits all common approach of prior art. Prior art using inefficient non-optimized effect stages with generally unbalanced and excessive thermal, liquid and gas loading on an individual or on a multiple component basis type of design for conventional chiller or refrigeration systems.

The multi-effect, multi-stage absorption refrigeration system may comprise a multi-stage regenerator-condenser system and multi-stage evaporator-absorber system provided with a pressure elevating devices and pressure controls therebetween. The preferred embodiment of the current invention utilizes a cooling system consisting of quad effects and/or with potentially additional effects stages based on available thermal energy temperature. Refrigeration systems of this type consist and primarily employ: a plurality of heat exchangers, a plurality of generators 228, 230, 232, 234, a plurality of condensing, units 236, 238, 240, 242, a plurality of evaporators 244 to which refrigerant is metered by a plurality of variable orifice expansion valves and a plurality of absorbing units.

A multi-effect absorption refrigeration system is provided with a plurality of condenser couplings and a parallel or series circuit for feeding the refrigerant-containing absorbent solution through the ultra-high, high, intermediate, medium, low temperature generators in a quintuple effects refrigeration system or high, intermediate, medium, low temperature generators configuration in a quad effect design optimization of a multi-effect system. Additional absorption effects stages may be realized with higher input temperatures by potential construction of adding corresponding corrosion resistance in response to additional effects higher temperature, pressures, liquid and gas corrosiveness. The coupling of components will enhance the internal recovery of thermal energy within the system, given the ability to effectively communicate thermal energy between components within the system and thereby increase the system's overall thermal efficiency thereof.

In a quad effect absorption refrigeration system, solution flows from an absorber to the first 228, second 230, third 232 and fourth 234 generators connected in parallel. Solution exiting the first generator 228 returns to the mufti-absorber system. Solution exiting the second generator 230 flows to a third generator 232 which flows to the fourth generator 234 connected in series with the second generator 230. Refrigerant vapor from each generator is condensed in a respective condenser 236. The fourth condenser 242 exchanges thermal energy with third generator 232, the third condenser 240 exchanges thermal energy with the second generator 230 and the second condenser 238 exchanges energy with the first generator 228.

In another embodiment, utilizing a quintuple effect absorption refrigeration system, solution flows from an absorber to the first, second, third, fourth and fifth generators connected in parallel. Solution exiting the first generator returns to the multi-absorber system. Solution exiting the second generator flows to a third generator which flows to the fourth generator which flows to a fifth generator connected in series with the second generator. Refrigerant vapor from each generator is condensed in a respective condenser. The fifth condenser exchanges thermal energy with the fourth generator, the fourth condenser exchanges thermal energy with third generator, the third condenser exchanges thermal energy with the second generator and the second condenser exchanges thermal energy with the first generator. Additional effect stages can be added using the above teachings in response to an increase in additional input temperatures and increased cooling requirements.

Figure 9:
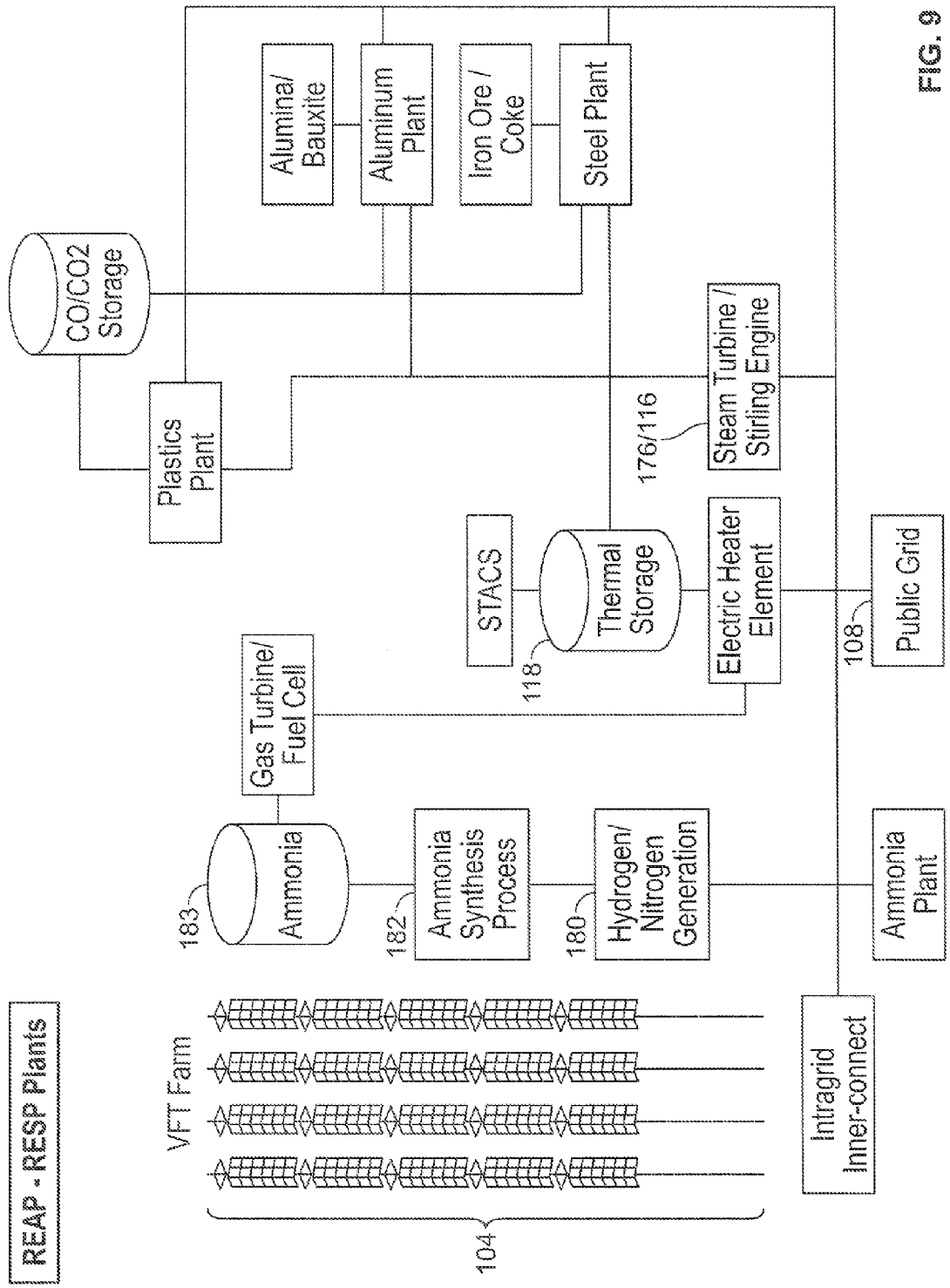
FIG. 9 is a flowchart according to one or more examples of an embodiment of the common installation connections of a Renewable Energy Aluminum Plant ("REAP") and a Renewable Energy Steel Plant ("RESP") in accordance with the present invention.

Referring to FIG. 9, a flowchart of an alternative embodiment utilizing wind 104 power and chemical byproducts is shown. The alternative embodiment uses generated rotational and/or linear movement applied to a pump or compressor for the pressurization and communication of liquids, gases and/or working fluid. FIG. 9 illustrates an alternative embodiment wherein electrical energy derived from rotational work of wind 104 power is used to power chemical and thermal byproducts for use and/or storage 110. An ammonia synthesis module is utilized to use and/or store ammonia 183 for use in a gas turbine or other commercial uses. Also, said electrical energy is utilized to power an electric heater for thermal energy storage 110 for use with a Stirling engine 116 and/or steam turbine 176. This power generation allows for the production of chemical by products including, but not limited to, hydrogen, carbon dioxide, carbon monoxide, ammonia and nitrogen. Another embodiment with less efficiency and not optimum performance would entail the usage of a steam engine in place of a Stirling process engine 116.

Figure 10:
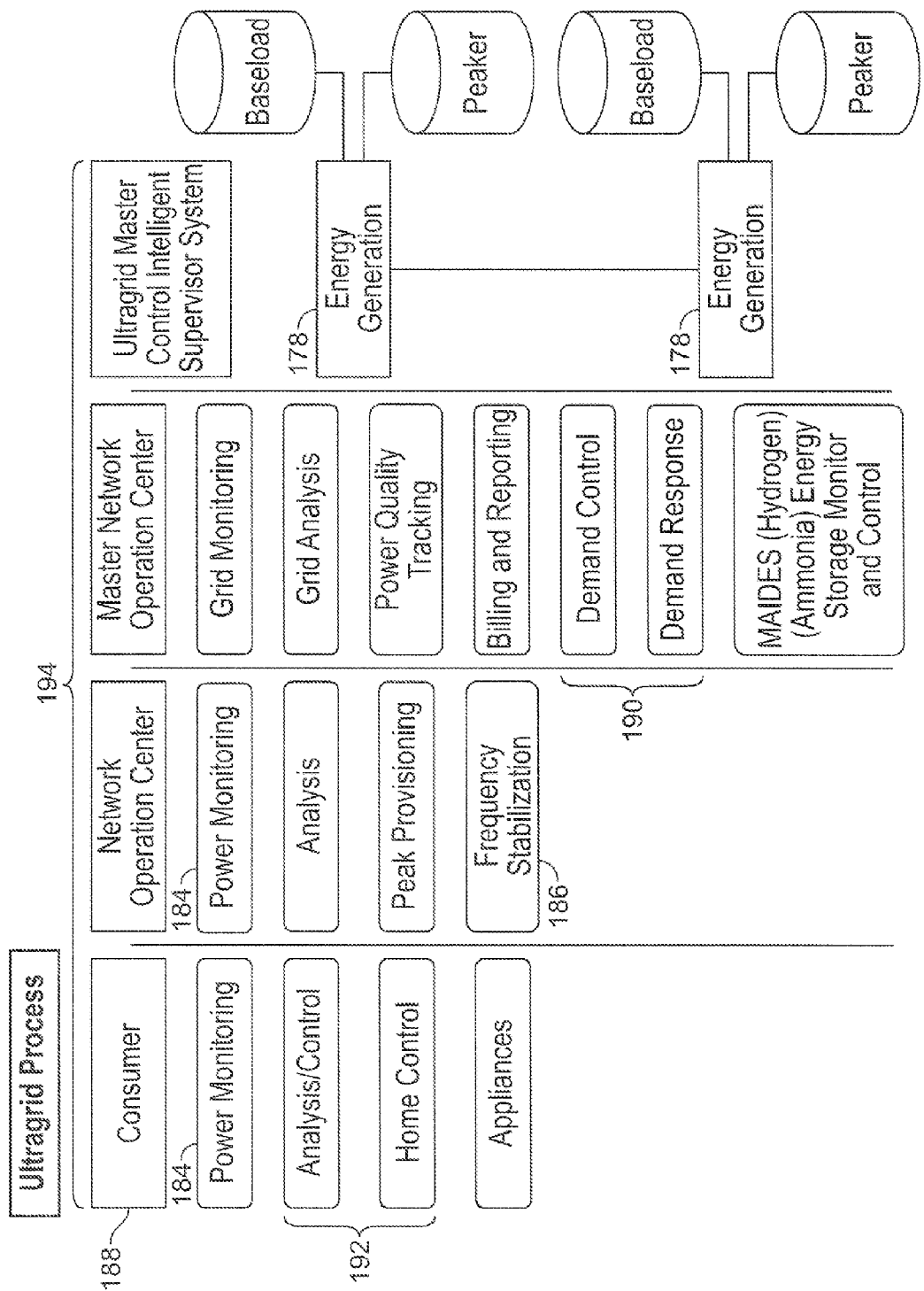
FIG. 10 is a flowchart according to one or more examples of an embodiment of the improved smart grid, ULTRA-GRID™, layers in accordance with the present invention.

Referring to FIG. 10 a schematic of the ULTRAGRID™ 194 software control layers is shown. Artificial Intelligence Management System ("AIMS") integration provides software and hardware based integrated control data acquisition and processing for grid management 188, energy generation system 178, hydrogen generation system 180, ammonia production system 182, energy regeneration system, performance tuning, power monitoring 184, frequency matching 186 and control system redundancy. This is combined with machine learning for automated maintenance scheduling for enhanced uptime availability. The system additionally offers a secured SCADA integration solution for data interfacing for local and remote visual overview, monitoring and control.

An alternative embodiment includes a Modular Alkaline Transaquatic Electrolyzer ("MATE") for mass production of hydrogen with scalable gaseous output based on variable energy input, hydrogen production and storage for purpose of resell or as a short and long term storage medium for energy storage, backup generation fuel source or as the base for other product uses. This would work in conjunction with an Ammonia Production System ("APS") 182 which consists of storage for incoming high pressure gaseous hydrogen from the MATE style alkaline hydrogen electrolyzers and nitrogen gases from nitrogen generators for use in a highly customized Haber/Bosch ammonia synthesis system. Converted ammonia gases are then cooled and transformed into liquid and transported to temporary or long term storage 183 for later use and/or final product conversions. System control and data management is integrated into a central control system and data transfer for supervisor management system.

Additionally, the system provides active condition monitoring of system components and sensors for health monitoring, identify changes and trends to optimize overall performance, monitor alert levels and contact maintenance of pending issues for a proactive maintenance scheduling approach before faults occur. Consumer grid management 188 system integration provides intelligent control of energy generation for load matching 190 and projected requirements of the load generation system for higher generated energy utilization. The system also actively monitors and controls regeneration energy systems for backup and base load provisioning to prevent brownouts from lack of energy generation availability. Smartgrid interfacing 192 and monitoring allows the system to control energy generation and project energy usage.

Energy generation system 178 integration provides intelligent interfacing of generation systems and load provisioning systems. Interaction of data between systems allows stable grid 109 power control with less power spikes while increasing uptime availability promoting maximum efficiency of energy processing and storage systems. The integrated communication bridge allows energy stored locally from energy generation sources 178 to collaborate intragrid 109 for power conversion based on variable input energy to thermal storage 110 systems.

The energy storage system integration enables maximum energy generation with optimized energy collection as well as mission critical response times for the highest efficiency and safety levels. Thermal energy to electrical and thermal energy on demand for thermal intensive applications integration allows timely and responsive energy generation capabilities to respond to heavy baseline load requirements and needs based on Smartgrid 192 communications.

ULTRAGRID™ 194 system integration allows fast interaction of energy systems for maximum power availability and flexibility to handle all system needs and energy requirements. This integration extends the compatibility and usability into additional initial end user product design and manufacturing. Additionally other device power and control systems can be substituted. ULTRAGRID™ 194 is designed in layers of components potentially consisting of energy generation, energy storage, energy provisioning, grid layer, consumer layer and end user component layer. Using layering will allow for simple logic integration, flexible information access, adaptability and expandability, rapid response, quick and easy installation and robust/secure operation.

Another improvement of the preferred embodiment is integration and inclusion of/compatibility with external software packages, i.e. ULTRAGRID™ 194, which comprises a complete line of consumer and commercial products and services for maximizing efficiencies and energy stability through enterprise utility grid provisioning systems from a combined software and hardware solution. Additionally other device power and control systems can be substituted. Software for consumers allows for local and remote use to analyze and control personal energy use and enables integration into the ULTRAGRID™ ZH1 home control and security system. Hardware for consumers may include stand-alone plugin adapters namely the ULTRAGRID™ Z1 allows common household appliances to be plugged in allowing them to become smart appliances. Additionally, compatibility and connectivity to other currently available automation and control devices can be substituted for compatibility and continuity. Another improvement involves ULTRAGRID™ 194 user sensor data monitored and stored from ULTRAGRID™ ZA1 enabled smart devices such as televisions, refrigerators and like user owned appliances, using a common data interface and network. A further improvement of the system, is that it will monitor other ULTRAGRID™ 194 interfaced STACS grid connected sites for grid energy load balancing for nominal load provisioning to enable reserve capacity generation capability for power quality and energy availability enhancement. Additionally the system will monitor STACS thermal storage 110 grid connected sites for grid energy load balancing and nominal load provisioning to enable reserve capacity generation capability.

Further, the improved system will allow loss of an energy generator's power to be reallocated and provisioned from localized storage to an online and available status. This assist mode from the local system and other active system nodes is initialized in response to ULTRAGRID™ 194 command and control activation to prevent localized grid 109 collapse and power quality fluctuations. A further improvement is the inclusion of ULTRAGRID™ 194 compatibility allowing communication from all sites and management of the sites' statuses from a primary, centralized command and control, integrated network operations center. The interconnected networked data control systems and subsystems will allow directing energy where and when needed and offer beneficial recycling and reclamation of waste energy and heat. Another improvement is enhanced consumer power quality and grid 109 stabilization during diurnal cycle with its variation and seasonal balancing requirements. This is effectuated by using localized consumer distributed thermal storage 110 during prime time energy usage which occurs naturally during daytime hours. This can be supplemented to maintain optimum availability and reliability via external grid energy to thermal conversion during off peak hours.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

The invention claimed is:

1. A process comprising:
    a) Capturing an energy; said captured energy comprising wind energy, solar photovoltaic energy and thermal energy;
    b) Converting at least one of the captured energy via steam turbine or Stirling engine to produce electrical energy;
    c) Utilizing at least one captured energy to operate a generator to produce at least one intermediary;
    d) Wherein said intermediary comprises at least one of steam, electricity, water, hydrogen, oxygen, nitrogen, argon, neon, xenon, krypton and ammonia;
    e) Said at least one intermediary operates a distillation module to purify water;
    f) Said at least one intermediary operates an electrolyzer to separate said purified water into at least one of its component chemicals;
    g) Said at least one intermediary operates a compressor for ammonia production;
    h) Said at least one intermediary operates an ammonia reactor for ammonia production;
    i) Said at least one intermediary operates a pressure swing absorption module to produce nitrogen and noble gases;
    j) Said at least one intermediary and captured energy stored in at least one of a thermal energy storage unit, chemical storage unit and electrical grid unit; and
    k) A multi-effect absorption refrigeration system, wherein said multi-effect absorption refrigeration system comprises a plurality of evaporators, absorbers, heat exchangers and condensers.

2. The process of claim 1 wherein said thermal energy is captured via at least one of solar thermal energy and geothermal energy.

3. The process of claim 1 further comprising:
    a) Inputs and outputs to an existing electrical grid; said existing electrical grid separated from the energy capture, storage and conversion processes by a substation.

4. The process of claim 1 wherein said thermal energies are stored in combinations of high-heat capacity fluids, medium-heat capacity fluids, low-heat capacity fluids and working fluids in at least one corresponding storage tank.

5. The process of claim 4 utilizing at least one of said high-heat capacity fluids, medium-heat capacity fluids, low-heat capacity fluids and working fluids to operate at least one ammonia cooling, vapor-exchanger for cold temperature energy storage.

6. The process of claim 1 wherein said Stirling engine comprises:
    a) A multi-cylinder Stirling cycle heat engine wherein said cylinders are arranged in at least two rows;
    b) A first row of cylinders staggered relative to a second row of cylinders and the longitudinal center axes of said first row cylinders forming an angle with the longitudinal center axes of said second row cylinders;
    c) At least one of a compression side cylinder, a power piston, a regenerator area, a displacer cylinder and a piston;
    d) Said at least two rows relating to a plurality of positioning members positioning said cylinders in at least one of a linear, inline "V", double "V", "W", or rotary arrangement;
    e) An over-sized high-heat thermal loop interfacing with said displacer cylinder;
    f) An ice water cooling loop interfacing with said compression side cylinder;
    g) an additional loop interface;
    h) said additional loop interface utilizing waste heat from said engine to heat media in a waste-heat loop; and
    i) Utilizing said additional loop as a radiant heat source for at least one of a device and area.

7. The process of claim 1 wherein said multi-effect absorption refrigeration system further comprises:
    a) A highest input temperature in a first generator;
    b) A heat exchanger between a first condenser and a second generator;
    c) A heat exchanger between a second condenser and a third generator;
    d) A heat exchanger between a third condenser and a fourth generator;
    e) Wherein each said generator removes a portion of refrigerant vapor to reduce the highest input temperature to a successively lower temperature to each successive said condenser.

8. The process of claim 1 further comprising:
a) At least one linear parabolic reflector;
b) At least one linear receiver comprising:
   i) At least one high-temperature absorber;
   ii) At least one medium-temperature absorber; and
   iii) at least one of a coordinating reflector and radiator having at least one high-temperature thermal fluid capture loop and medium-temperature thermal fluid capture loop; and
c) Crescent-shaped cross-supports attaching said linear parabolic reflector and said linear receiver; providing unimpeded independent rotational motion of said linear parabolic reflector.

9. The process of claim 1 further comprising:
a) A computerized control system to monitor, process, control and re-allocate the captured energy, conversion of at least one of said intermediary and storing of the captured energy, with machine learning based on at least one of a previous user input and defined rules;
b) At least one control layer, said layers selected from the group consisting of:
   i) A Master control intelligent supervisor system layer;
   ii) A Master network operation center layer;
   iii) A Network operation center layer;
   iv) A Consumer appliance and home control layer; and
   v) Combinations thereof.

10. The process of claim 8 wherein said master control intelligent supervisor system layer supervises energy capture and generation based on Baseload and Peaker demand input and said master network operation center layer monitors and analyzes grid operations, tracks power quality, creates billing and reports, controls and responds to changes in demand and monitors and controls energy storage.

11. A process comprising:
a) Capturing an energy; said captured energy comprising wind energy, solar photovoltaic energy, solar thermal energy and geothermal energy;
b) Converting said at least one captured energy via steam turbine or Stirling engine to produce electrical energy;
c) Utilizing said at least one captured energy to operate a generator to produce at least one intermediary;
d) Wherein said at least one intermediary comprises at least one of steam, electricity, water, hydrogen, oxygen, nitrogen, argon, neon, xenon krypton and ammonia;
e) Said at least one intermediary operates a distillation module to purify water;
f) Said at least one intermediary operates an electrolyzer to separate said purified water into at least one of its component chemicals;
g) Said at least one intermediary operates a compressor for ammonia production;
h) Said at least one intermediary operates an ammonia reactor for ammonia production;
i) Said at least one intermediary operates a pressure swing absorption module to produce nitrogen and noble gases;
j) Storing at least one of the captured energy and intermediary in thermal intermediates, said thermal intermediates comprising a combination of high-heat capacity fluids, medium-heat capacity fluids, low-heat capacity fluids and working fluids;
k) At least one of said high-heat capacity fluids, medium-heat capacity fluids, low-heat capacity fluids and working fluids operating at least one ammonia cooling, vapor-exchanger for cold temperature energy storage;
l) Storing at least one of said captured energy and intermediary as at least one of a chemical and electrical intermediate;
m) A multi-effect absorption refrigeration system wherein said multi-effect absorption refrigeration system comprises a plurality of evaporators, absorbers, heat exchangers and condensers;
n) Said multi-effect absorption refrigeration system further comprises:
   i) A highest input temperature in a fourth generator;
   ii) A heat exchanger between a fourth condenser and a third generator;
   iii) A heat exchanger between a third condenser and a second generator;
   iv) A heat exchanger between a second condenser and a first generator;
   v) Wherein each said generator removes a portion of refrigerant vapor to reduce the highest input temperature to a successively lower temperature to each successive said condenser;
o) At least one linear parabolic reflector;
p) Said at least one linear parabolic reflector interfacing with at least one linear receiver;
q) Said linear receiver comprising:
   i) At least one high-temperature absorber;
   ii) At least one medium-temperature absorber;
   iii) At least one of a coordinating reflector and radiator comprising at least one high-temperature thermal fluid capture loop and medium-temperature thermal fluid capture loop;
r) Crescent-shaped cross-supports attaching said linear parabolic reflector and said linear receiver, providing structural support and unimpeded independent rotational motion of said parabolic reflector to track movement of sun;
s) A ratio of said reflectors to said receivers between 8 and 24; and
t) Said process connecting to an existing electrical grid.

12. The process of claim 11 wherein said Stirling engine comprises:
j) A multi-cylinder Stirling cycle heat engine wherein said cylinders are arranged in at least two rows;
k) A first row of cylinders staggered relative to a second row of cylinders and the longitudinal center axes of said first row cylinders forming an angle with the longitudinal center axes of said second row cylinders;
l) At least one of a compression side cylinder, a power piston, a regenerator area, a displacer cylinder and a piston;
m) Said at least two rows relating to a plurality of positioning members position said cylinders in at least one of a linear, inline "V", double "V", "W", or rotary arrangement;
n) An over-sized high-heat thermal loop interfacing with said displacer cylinder;
o) An ice water cooling loop interfacing with said compression side cylinder;
p) an additional loop interface;
q) said additional loop interface utilizing waste heat from said engine to heat media in a waste-heat loop; and
r) Utilizing said additional loop as a radiant heat source for at least one of a device and area.

13. The process of claim 11 wherein said existing electrical grid is separated from said process by at least one electrical substation.

14. The process of claim 11 further comprising a computerized control system with machine learning based on at least one of a previous user input and defined rules, to monitor, process, control and re-allocate at least one of the capturing, converting and storing steps wherein said computerized control system comprises at least one of a:
j) Master control intelligent supervisor system;
k) Master network operation center;
l) Network operation center; and
m) Consumer appliance and home control;
wherein said master control intelligent supervisor system layer supervises energy capture and generation based on Baseload and Peaker demand input and said master network operation center layer monitors and analyzes grid operations, tracks power quality, creates billing and reports, controls and responds to changes in demand and monitors and controls energy storage;
wherein said network operation center monitors and analyzes power, peak provisioning and frequency stabilization and said consumer control layer monitors and reports end user dwelling usage and provides end users with control over dwelling and appliances.

* * * * *